(12) United States Patent
Nito

(10) Patent No.: US 12,537,332 B2
(45) Date of Patent: Jan. 27, 2026

(54) FIRST CONNECTOR, SECOND CONNECTOR AND CONNECTOR ASSEMBLY

(71) Applicant: SUMITOMO WIRING SYSTEMS, LTD., Mie (JP)

(72) Inventor: Ayaka Nito, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 316 days.

(21) Appl. No.: 18/282,977

(22) PCT Filed: Mar. 29, 2022

(86) PCT No.: PCT/JP2022/015328
§ 371 (c)(1),
(2) Date: Sep. 19, 2023

(87) PCT Pub. No.: WO2022/210665
PCT Pub. Date: Oct. 6, 2022

(65) Prior Publication Data
US 2024/0170882 A1    May 23, 2024

(30) Foreign Application Priority Data
Mar. 31, 2021 (JP) .................................. 2021-059393

(51) Int. Cl.
*H01R 13/44*    (2006.01)

(52) U.S. Cl.
CPC ......... *H01R 13/44* (2013.01); *H01R 2201/26* (2013.01)

(58) Field of Classification Search
CPC ............... H01R 13/44; H01R 2201/26; H01R 13/631; H01R 13/62938; H01R 13/4538
See application file for complete search history.

(56) References Cited

U.S. PATENT DOCUMENTS 6,305,957 B1 * 10/2001 Fink ................. H01R 13/62977
439/157
7,857,640 B1 * 12/2010 Lee ........................ H01R 24/78
439/490

(Continued)

FOREIGN PATENT DOCUMENTS

| JP | 2011-086478 A | 4/2011 |
| JP | 2016-213084 A | 12/2016 |
| WO | 2014/204483 A1 | 12/2014 |

OTHER PUBLICATIONS

International Search Report issued on Jun. 14, 2022 for WO 2022/210665 A1 (4 pages).

*Primary Examiner* — Truc T Nguyen
(74) *Attorney, Agent, or Firm* — Venjuris, P.C.

(57) ABSTRACT

A first connector is provided with a first terminal including a tip part extending in a first direction, a first connector housing for holding the first terminal and a slide member to be held in the first connector housing. The first connector housing includes a protecting portion for covering a part of the first terminal in directions orthogonal to the first direction except a second direction, a first opening open in the first direction, and a second opening open in the second direction. The slide member is slidable between a closing position for closing the second opening and an opening position in a first opposite direction. The slide member includes a slide body portion for closing the second opening at the closing position and a tip protecting portion integrally formed to the slide body portion and configured to protect the tip part of the first terminal.

23 Claims, 20 Drawing Sheets

(56) References Cited

U.S. PATENT DOCUMENTS

| | | |
|---|---|---|
| 9,608,357 B1 | 3/2017 | Sundarakrishnamachari et al. |
| 11,509,089 B1* | 11/2022 | Atsushi .................. H01R 31/06 |
| 2003/0171019 A1* | 9/2003 | Itoh .................... H01R 13/6315 |
| | | 439/247 |
| 2010/0178787 A1* | 7/2010 | Lux .................... H01R 13/4534 |
| | | 439/271 |
| 2013/0237074 A1 | 9/2013 | Yagome et al. |
| 2015/0162688 A1* | 6/2015 | Swoboda ............. H01R 13/193 |
| | | 439/347 |
| 2017/0062969 A1* | 3/2017 | Kida .................. H01R 13/6275 |
| 2018/0198229 A1* | 7/2018 | Cheng ................ H01R 13/703 |
| 2019/0288439 A1* | 9/2019 | Bae .................. H01R 13/4538 |
| 2022/0173544 A1* | 6/2022 | Sakai ................. H01R 13/502 |
| 2022/0344858 A1* | 10/2022 | Farinola .............. H01R 13/5804 |
| 2023/0124805 A1* | 4/2023 | Harmelink ........... H01R 13/639 |
| | | 439/352 |

* cited by examiner

FIRST CONNECTOR, SECOND CONNECTOR AND CONNECTOR ASSEMBLY

CROSS REFERENCE TO RELATED APPLICATIONS

This application is a national phase of PCT application No. PCT/JP2022/015328, filed on 29 Mar. 2022, which claims priority from Japanese patent application No. 2021-059393, filed on 31 Mar. 2021, all of which are incorporated herein by reference.

TECHNICAL FIELD

The present invention relates to a first connector, a second connector and a connector assembly.

BACKGROUND

Conventionally, a wiring harness to be mounted in a vehicle such as a hybrid or electric vehicle is known to include a wire and a connector mounted on an end part of the wire. The connector includes a terminal made of metal and connected to an end of the wire and a connector housing for holding that terminal. The connector housing of this type generally includes a protecting portion for covering the terminal except in a tip direction. To arrange a terminal of a mating connector to be connected to the terminal in an orthogonal direction, the protecting portion may be partially cut (see, for example, Patent Document 1). In such a connector, a protecting member made of resin is provided not only on a tip side of the terminal, but also a side of the terminal orthogonal to an extending direction of the terminal to prevent an electric shock caused by the touch of a finger or the like with the terminal.

PRIOR ART DOCUMENT

Patent Document

Patent Document 1: JP 2016-522550 A

SUMMARY OF THE INVENTION

Problems to be Solved

In the above connector, it is desired to reduce the number of components.

The present disclosure aims to provide a first connector, a second connector and a connector assembly capable of reducing the number of components.

Means to Solve the Problem

The present invention is directed to a first connector with a first terminal including a tip part extending in a first direction, a first connector housing for holding the first terminal and a slide member to be held in the first connector housing, the first connector housing including a protecting portion for covering a part of the first terminal in directions orthogonal to the first direction except a second direction, a first opening open in the first direction in the protecting portion and a second opening open in the second direction in the protecting portion, the slide member being slidable between a closing position for closing the second opening and an opening position in a first opposite direction opposite to the first direction, and the slide member including a slide body portion for closing the second opening at the closing position and a tip protecting portion integrally formed to the slide body portion, the tip protecting portion protecting the tip part of the first terminal at the closing position.

The present disclosure is directed to a second connector attachable to and detachable from a first connector, the first connector including a first terminal including a tip part extending in a first direction, a first connector housing for holding the first terminal and a slide member to be held in the first connector housing, the first connector housing including a protecting portion for covering a part of the first terminal in directions orthogonal to the first direction except a second direction, a first opening open in the first direction in the protecting portion and a second opening open in the second direction in the protecting portion, the slide member being slidable between a closing position for closing the second opening and an opening position in a first opposite direction opposite to the first direction, and the slide member including a slide body portion for closing the second opening at the closing position and a tip protecting portion integrally formed to the slide body portion, the tip protecting portion protecting the tip part of the first terminal at the closing position, the second connector being provided with a pressing portion for sliding the slide member to the opening position by pressing a pressed portion provided in the slide member when the second connector is assembled with the first connector.

The present disclosure is directed to a connector assembly with a first connector and a second connector attachable to and detachable from the first connector, the first connector including a first terminal including a tip part extending in a first direction, a first connector housing for holding the first terminal and a slide member to be held in the first connector housing, the first connector housing including a protecting portion for covering a part of the first terminal in directions orthogonal to the first direction except a second direction, a first opening open in the first direction in the protecting portion and a second opening open in the second direction in the protecting portion, the slide member being slidable between a closing position for closing the second opening and an opening position in a first opposite direction opposite to the first direction, and the slide member including a slide body portion for closing the second opening at the closing position and a tip protecting portion integrally formed to the slide body portion, the tip protecting portion protecting the tip part of the first terminal at the closing position.

Effect of the Invention

According to the first connector, the second connector and the connector assembly of the present disclosure, an effect of being capable of reducing the number of components is achieved.

DETAILED DESCRIPTION TO EXECUTE THE INVENTION

Description of Embodiments of Present Disclosure

Figure 1:
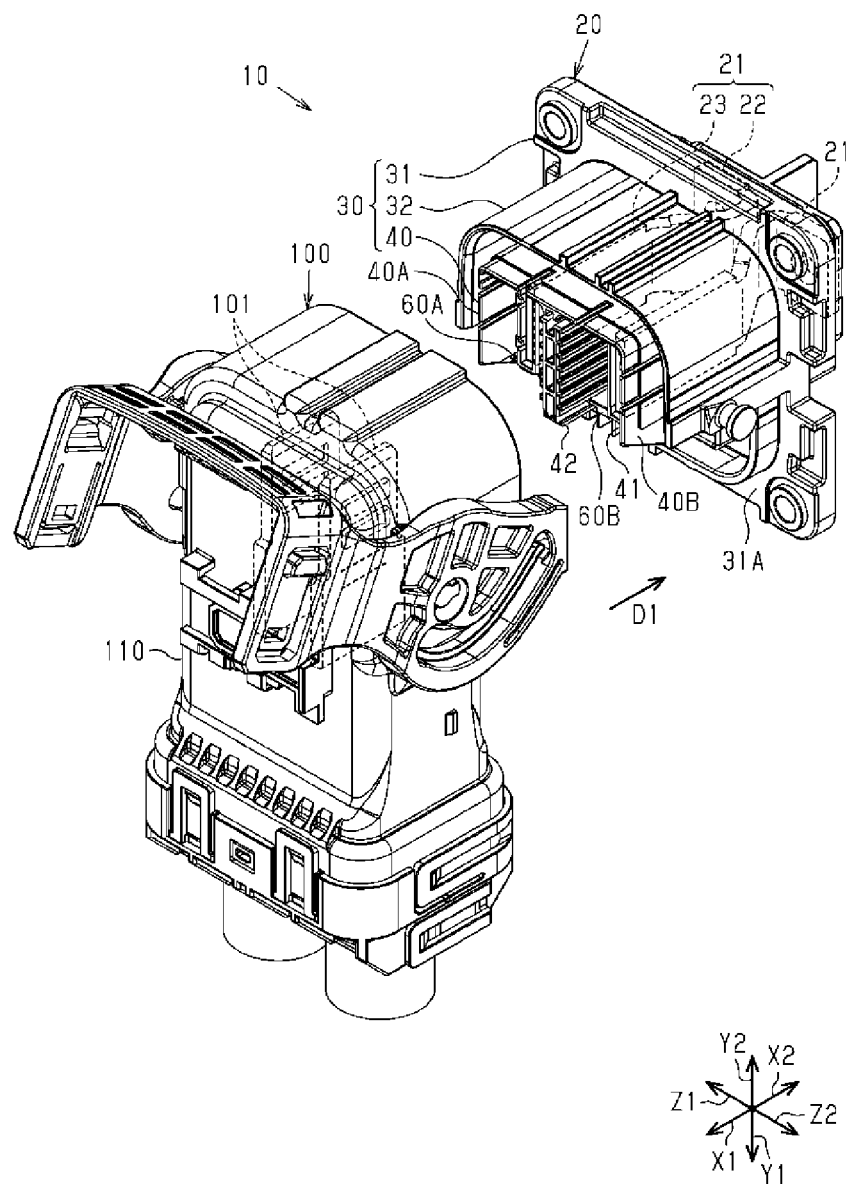
FIG. 1 is a schematic exploded perspective view showing a connector assembly of one embodiment.

First, embodiments of the present disclosure are listed and described.

[1] The first connector of the present disclosure is provided with a first terminal including a tip part extending in a first direction, a first connector housing for holding the first terminal and a slide member to be held in the first connector housing, the first connector housing including a protecting portion for covering a part of the first terminal in directions orthogonal to the first direction except a second direction, a first opening open in the first direction in the protecting portion and a second opening open in the second direction in the protecting portion, the slide member being slidable between a closing position for closing the second opening and an opening position in a first opposite direction opposite to the first direction, and the slide member including a slide body portion for closing the second opening at the closing position and a tip protecting portion integrally formed to the slide body portion, the tip protecting portion protecting the tip part of the first terminal at the closing position.

According to this configuration, the slide member is provided which is slidable between the closing position for closing the second opening open in the second direction and the opening position. Further, in the slide member, the slide body portion for closing the second opening at the closing position and the tip protecting portion for protecting the tip part of the first terminal at the closing position are integrally formed. Since the second opening is closed by the slide body portion with the slide member located at the closing position in this way, it can be suppressed that a worker's finger touches the first terminal, for example, through the second opening. Further, the tip part of the first terminal is protected by the tip protecting portion with the slide member located at the closing position. Thus, even if the worker's finger enters the protecting portion, for example, through the first opening, the touch of the worker's finger with the first terminal can be suppressed by the tip protecting portion. Further, since the slide body portion and the tip protecting portion are integrally formed, the number of components can be reduced as compared to the case where those slide body portion and tip protecting portion are separate components. In this way, the number of components can be reduced while an electric shock prevention measure is taken.

[2] Preferably, the tip protecting portion is provided on a side further in the first opposite direction than a connected part of a second terminal provided in a second connector to be assembled with the first connector and the first terminal at the opening position.

According to this configuration, the tip protecting portion is provided on the side further in the first opposite direction than the connected part of the first terminal and the second terminal of the second connector at the opening position. Thus, the slide member is not arranged near the connected part of the first and second terminals, for example, in a state where the assembling of the first and second connectors is completed. Therefore, even if the slide member is broken due to durability deterioration or the like, it can be suppressed that the broken slide member adversely affects the electrical connection of the first and second terminals. That is, a reduction in the electrical connection reliability of the first and second terminals can be suppressed.

[3] Preferably, the protecting portion includes a pair of first guide grooves provided in a pair of side walls constituting the second opening, the slide member includes a pair of first guide portions to be fit into the pair of first guide grooves, and the slide member is slidable in the first direction and the first opposite direction by the first guide portions being guided by the first guide grooves. According to this configuration, the first guide portions are guided by the first guide grooves, whereby the slide member can be smoothly slid in the first direction and the first opposite direction. Further, the inclination of the slide member can be suppressed when the slide member slides.

[4] Preferably, the protecting portion includes a pair of second guide grooves provided in the pair of side walls, the second guide grooves are provided apart from the first guide grooves in the second direction, and the slide member includes a pair of second guide portions to be fit into the pair of second guide grooves. According to this configuration, the second guide portions are guided by the second guide grooves, whereby the slide member can be smoothly slid in the first direction and the first opposite direction. Further, since the first and second guide portions are respectively guided by the first and second guide grooves separated from each other in the second direction when the slide member slides, the inclination of the slide member can be suitably suppressed.

[5] Preferably, a planar shape of the slide member when viewed from the first direction is formed point-asymmetrically with respect to a center axis of the slide member extending in parallel to the first direction, only one of the pair of first guide portions includes a groove portion, and the first guide portion including the groove portion is fittable into one of the pair of first guide grooves, but the first guide portion not including the groove portion is not fittable. According to this configuration, the groove portion is provided in only one of the pair of first guide portions. Further, the first guide portion including the groove portion is fittable into one of the pair of first guide grooves, and the first guide portion not including the groove portion is not fittable. Thus, the slide member can be assembled with the first connector housing only in such a posture that the first guide portion including the groove portion is fit in the one first guide groove. Therefore, erroneous assembling of the slide member can be suppressed.

[6] Preferably, the slide member includes a pressed portion to be pressed by a pressing portion provided in a second connector to be assembled with the first connector, and the slide member slides to the opening position by the pressed portion being pressed by the pressing portion when the second connector is assembled with the first connector. According to this configuration, when the second connector is assembled with the first connector, the pressed portion is pressed by the pressing portion of the second connector, whereby the slide member slides to the opening position. Thus, it is not necessary to slide the slide member to the opening position, for example, by a jig or the like. That is, a worker can slide the slide member to the opening position without requiring another step only by assembling the second connector with the first connector.

[7] Preferably, the pressed portion is brought into surface contact with the pressing portion. According to this configuration, the slide member can be smoothly and stably slid to the opening position as compared to the case where the pressed portion is brought into point contact with the pressing portion.

[8] Preferably, the slide member includes an engaged portion to be engaged with an engaging portion provided in the second connector, and the slide member slides to the closing position by the engaged portion being pulled by the engaging portion when the second connector is detached from the first connector. According to this configuration, when the second connector is detached from the first connector, the slide member slides to the closing position by the engaged portion being pulled by the engaging portion of the second connector. Thus, it is not necessary to slide the slide member to the closing position, for example, by a jig or the like. That is, the worker can slide the slide member to the closing position without requiring another step only by detaching the second connector from the first connector. Further, if the slide member is biased in the first direction, for example, by a biasing member such as a spring, the slide member can be slid to the closing position without requiring another step. However, the above configuration does not require the biasing member unlike this configuration.

[9] Preferably, the slide member includes a flexible piece having a tip part extending in the first direction, the flexible piece being flexible in a direction orthogonal to the first direction, the engaged portion is provided on a tip part of the flexible piece, and the engaged portion is provided at a position projecting further in the tip part of the first terminal at the closing position. According to this configuration, the engaged portion is provided on the tip part of the flexible piece flexible in the direction orthogonal to the first direction. Further, with the slide member located at the closing position, the engaged portion is located at the position projecting further in the first direction than the tip part of the first terminal. Thus, when the flexible piece is deflected in the direction orthogonal to the first direction, the contact of the engaged portion with the first terminal can be suppressed and the flexible piece can be suitably deflected. By the deflection of the flexible piece, the engaged portion provided on the tip part of the flexible piece and the engaging portion of the second connector can be easily engaged. That is, when the second connector is assembled with the first connector, the engaging portion and the engaged portion can be easily engaged by the deflection of the flexible piece. Further, when the second connector is detached from the first connector, the engaging portion and the engaged portion can be easily disengaged by the deflection of the flexible piece.

[10] Preferably, the tip protecting portion is formed into a ring shape to surround an outer periphery of the first terminal, a tip part of the tip protecting portion is formed to project further in the first direction than the tip part of the first terminal at the closing position, and the engaged portion is provided on a part of the tip part of the tip protecting portion. According to this configuration, with the slide member located at the closing position, the tip part of the ring-shaped tip protecting portion surrounding the outer periphery of the first terminal is formed to project further in the first direction than the tip part of the first terminal. Thus, even if the worker's finger enters the protecting portion, for example, through the first opening, the touch of the worker's finger with the first terminal can be suitably suppressed by the tip protecting portion. Further, the engaged portion constitutes a part of the tip protecting portion. Thus, the engaged portion has a function of engagement with the engaging portion of the second connector and also a function of suppressing the touch of the worker's finger with the first terminal.

Here, a "ring" in this specification means a ring stricture continuous without interruption as a whole, i.e. an endless structure whose start point and end point coincide. Further, the "rings" in this specification include a circular ring having a circular outer edge shape, a ring having an elliptical or oval outer edge shape, a polygonal ring having a polygonal outer edge shape and a ring having a round polygonal outer edge shape, and mean an arbitrary closed shape having an outer edge shape connected by straight lines or curves. The "ring" means a shape having a through hole in a plan view, and includes a shape in which an outer edge shape and an inner peripheral shape of the through hole are the same and a shape in which an outer edge shape and an inner peripheral shape of the through hole are different. The "ring" includes a ring having a predetermined length extending along an axial direction, in which a center axis passing through a center of the through hole extends, and the magnitude of that length does not matter. Further, a "ring shape" in this specification may be regarded as a ring as a whole and may include a cut, a slit or the like in a part like a C shape.

[11] Preferably, a surface facing in the first direction in the engaged portion is provided on the same plane as a surface facing in the first direction in the tip protecting portion or provided on a side further in the first opposite direction than the surface facing in the first direction in the tip protecting portion. According to this configuration, the surface facing in the first direction in the engaged portion does not project further in the first direction than the surface facing in the first direction in the tip protecting portion. Thus, when the second connector is assembled with the first connector, it can be suppressed that a stress generated by contact with the second connector concentrates on the engaged portion. In this way, the breakage of the engaged portion can be suppressed.

[12] Preferably, the first terminal has a connection surface to be connected to a second terminal provided in the second connector, the slide member includes a recess provided in an inner peripheral surface of the tip protecting portion, and the recess is facing the connection surface. According to this configuration, the recess facing the connection surface of the first terminal is provided in the inner peripheral surface of the tip protecting portion. By providing this recess, the contact of the inner peripheral surface of the tip protecting portion and the connection surface of the first terminal can be suppressed when the slide member slides. Thus, it can be suppressed that the connection surface of the first terminal is worn due to contact with the inner peripheral surface of the tip protecting portion. As a result, it can be suppressed that a contact area of the first and second terminals is reduced, for example, due to the wear of the connection surface of the first terminal. Therefore, an increase in contact resistance in the connected part of the first and second terminals can be suitably suppressed. Consequently, heat generation in the connected part of the first and second terminals, can be suppressed.

Here, "facing each other" in this specification indicates that surfaces or members are at positions in front of each other and means not only a case where the both are at positions completely in front of each other, but also a case where the both are at positions partially in front of each other. Further, "facing each other" in this specification means both a case where another member different from two parts is interposed between the two parts and a case where nothing is interposed between the two parts.

[13] Preferably, the first terminal has a non-connection surface provided on a side opposite to the connection surface in a third direction, and the engaged portion is provided on a side opposite to the recess across the first terminal in the third direction. According to this configuration, the engaged portion is provided on the side opposite to the recess across the first terminal in the third direction. Since the engaged portion is provided on the side of the non-connection surface of the first terminal in this way, the engaged portion is not facing the connection surface of the first terminal. Thus, the contact of the engaged portion with the connection surface of the first terminal can be suppressed when the slide member slides. Therefore, the wear of the connection surface of the first terminal due to contact with the engaged portion can be suppressed. As a result, an increase in contact resistance in the connected part of the first and second terminals can be suitably suppressed, and heat generation in the connected part of the first and second terminals can be suppressed.

[14] Preferably, the slide member has a first inclined surface inclined with respect to a plane orthogonal to an assembly direction of the first connector and the second connector, and the first inclined surface guides the engaging portion such that the engaging portion and the engaged portion are disengaged with the slide member located at the closing position when the second connector is detached from the first connector. According to this configuration, the slide member has the first inclined surface for guiding the engaging portion such that the engaging portion is disengaged from the engaged portion with the slide member located at the closing position when the second connector is detached from the first connector. Thus, when the second connector is detached from the first connector, the engaging portion and the engaged portion can be easily disengaged. In this way, the second connector can be easily and properly detached from the first connector.

[15] Preferably, the slide member has a second inclined surface inclined with respect to a plane orthogonal to the assembly direction of the first connector and the second connector, and the second inclined surface guides the engaging portion such that the engaging portion is engageable with the engaged portion when the second connector is assembled with the first connector. According to this configuration, the slide member has the second inclined surface for guiding the engaging portion such that the engaging portion is engageable with the engaged portion when the second connector is assembled with the first connector. Thus, when the second connector is assembled with the first connector, the engaging portion and the engaged portion can be easily engaged. In this way, the second connector can be easily and properly assembled with the first connector.

[16] Preferably, the tip protecting portion has a third inclined surface provided on an outer peripheral surface of a tip part of the tip protecting portion, the third inclined surface is inclined with respect to a plane orthogonal to the assembly direction of the first connector and the second connector, and the third inclined surface guides the second connector into the first connector housing when the second connector is assembled with the first connector. According to this configuration, the tip protecting portion has the inclined surface for guiding the second connector into the first connector housing when the second connector is assembled with the first connector. Thus, the second connector can be easily connected to the first connector. In this way, the second connector can be easily and properly assembled with the first connector.

[17] Preferably, the slide member includes a plurality of the engaged portions. According to this configuration, since the slide member includes the plurality of engaged portions, the slide member can be smoothly and stably slid to the closing position as compared to a configuration including a single engaged portion.

[18] Preferably, the slide member includes a restricting protrusion provided on the tip part of the flexible piece, the restricting protrusion projects toward the first terminal in a deflection direction of the flexible piece, and the engaged portion projects in a direction opposite to a projecting direction of the restricting protrusion. According to this configuration, the retaining protrusion projecting toward the first terminal in the deflection direction of the flexible piece is provided on the tip part of the flexible piece. Thus, with the slide member located at the opening position, the retaining protrusion faces the first terminal. Accordingly, even if the flexible piece is going to be largely deflected toward the first terminal when the second connector is detached from the first connector, the retaining protrusion contacts the first terminal, thereby suppressing large deflection of the flexible piece. In this way, it can be suitably suppressed that the engaging portion and the engaged portion are disengaged, for example, due to large deflection of the flexible piece. That is, when the second connector is detached from the first connector, the disengagement of the engaging portion and the engaged portion can be suitably suppressed during a sliding movement of the slide member from the opening position to the closing position. Thus, when the second connector is detached from the first connector, the slide member can be suitably returned to the closing position by the engaged portion being pulled by the engaging portion.

[19] Preferably, the restricting protrusion has a top surface facing the first terminal, and a projecting amount of the restricting protrusion is so set that a clearance between the top surface of the restricting protrusion and the first terminal is smaller than an overlap amount of the engaged portion and the engaging portion with the slide member located at the opening position. According to this configuration, the projecting amount of the retaining protrusion is so set that the clearance between the top surface of the retaining protrusion and the first terminal is smaller than the overlap amount of the engaged portion and the engaging portion with the slide member located at the opening position. Here, the overlap amount of the engaging portion and the engaged portion is a distance along the deflection direction of the flexible piece in an overlapping region of the engaged portion and the engaging portion in the first direction. By setting the projecting amount of the restricting protrusion in this way, the top surface of the restricting protrusion can contact the first terminal before the engaged portion and the engaging portion are disengaged, for example, even if the flexible piece is deflected toward the first terminal when the second connector is detached from the first connector. Since any further deflection of the flexible piece can be restricted in this way, the disengagement of the engaged portion and the engaging portion can be suitably suppressed.

[20] Preferably, the top surface of the restricting protrusion is formed on a plane parallel to the first direction, and the first terminal is formed into a flat plate in a movable range of the restricting protrusion in the first direction and the first opposite direction. According to this configuration, the top surface of the retaining protrusion is formed on the plane parallel to the first direction and the first terminal is formed into a flat plate in the movable range of the retaining protrusion. Thus, the flat top surface of the retaining protrusion and the flat surface of the first terminal can be brought into contact. Since the top surface of the retaining protrusion and the first terminal can be suitably brought into contact in this way, for example, when the second connector is detached from the first connector, the deflection of the flexible piece can be suitably restricted. Therefore, the disengagement of the engaged portion and the engaging portion can be suitably suppressed.

[21] Preferably, the second connector of the present disclosure is attachable to and detachable from a first connector, the first connector including a first terminal including a tip part extending in a first direction, a first connector housing for holding the first terminal and a slide member to be held in the first connector housing, the first connector housing including a protecting portion for covering a part of the first terminal in directions orthogonal to the first direction except a second direction, a first opening open in the first direction in the protecting portion and a second opening open in the second direction in the protecting portion, the slide member being slidable between a closing position for closing the second opening and an opening position in a first opposite direction opposite to the first direction, and the slide member including a slide body portion for closing the second opening at the closing position and a tip protecting portion integrally formed to the slide body portion, the tip protecting portion protecting the tip part of the first terminal at the closing position, the second connector being provided with a pressing portion for sliding the slide member to the opening position by pressing a pressed portion provided in the slide member when the second connector is assembled with the first connector.

According to this configuration, the second connector includes the pressing portion for sliding the slide member to the opening position by pressing the pressed portion provided in the slide member when the second connector is assembled with the first connector. Thus, it is not necessary to slide the slide member to the opening position, for example, by a jig or the like. That is, the worker can slide the slide member to the opening position without requiring another step only by assembling the second connector with the first connector. Further, since a member for moving the slide member to the opening position needs not be provided in the first connector, the number of components can be reduced.

[22] Preferably, an engaging portion is provided which slides the slide member to the closing position by pulling an engaged portion provided in the slide member when the second connector is detached from the first connector.

According to this configuration, the second connector includes the engaging portion for moving the slide member to the closing position by pulling the engaged portion provided in the slide member when the second connector is detached from the first connector. Thus, it is not necessary to slide the slide member to the closing position, for example, by a jig or the like. That is, the worker can slide the slide member to the closing position without requiring another step only by detaching the second connector from the first connector.

[23] The connector assembly of the present disclosure is provided with a first connector and a second connector attachable to and detachable from the first connector, the first connector including a first terminal including a tip part extending in a first direction, a first connector housing for holding the first terminal and a slide member to be held in the first connector housing, the first connector housing including a protecting portion for covering a part of the first terminal in directions orthogonal to the first direction except a second direction, a first opening open in the first direction in the protecting portion and a second opening open in the second direction in the protecting portion, the slide member being slidable between a closing position for closing the second opening and an opening position in a first opposite direction opposite to the first direction, and the slide member including a slide body portion for closing the second opening at the closing position and a tip protecting portion integrally formed to the slide body portion, the tip protecting portion protecting the tip part of the first terminal at the closing position.

According this configuration, the slide member is provided which is slidable between the closing position for closing the second opening open in the second direction and the opening position. Further, in the slide member, the slide body portion for closing the second opening at the closing position and the tip protecting portion for protecting the tip part of the first terminal at the closing position are integrally formed. Since the second opening is closed by the slide body portion with the slide member located at the closing position in this way, it can be suppressed that the worker's finger touches the first terminal, for example, through the second opening. Further, the tip part of the first terminal is protected by the tip protecting portion with the slide member located at the closing position. Thus, even if the worker's finger enters the protecting portion, for example, through the first opening, the touch of the worker's finger with the first terminal can be suppressed by the tip protecting portion. Further, since the slide body portion and the tip protecting portion are integrally formed, the number of components can be reduced as compared to the case where those slide body portion and tip protecting portion are separate components. In this way, the number of components can be reduced while an electric shock prevention measure is taken.

Details of Embodiment of Present Disclosure

Specific examples of a first connector, a second connector and a connector assembly of the present disclosure are described below with reference to the drawings. In each figure, some of components may be shown in an exaggerated or simplified manner for the convenience of description. Further, a dimension ratio of each part may be different in each figure. "Parallel" and "orthogonal" in this specification mean not only strictly parallel and orthogonal, but also substantially parallel and orthogonal within a range in which functions and effects in an embodiment are achieved. Note that the present invention is not limited to these illustrations, but is represented by claims and intended to include all changes in the scope of claims and in the meaning and scope of equivalents.

(Configuration of Connector Assembly 10)

Figure 2:
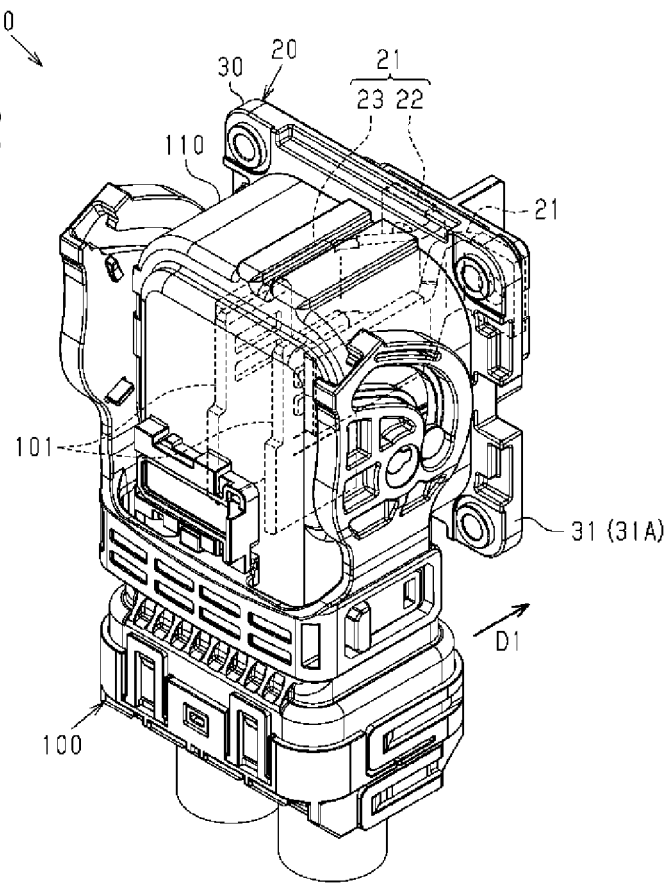
FIG. 2 is a schematic perspective view showing the connector assembly of the embodiment.
Figure 2:
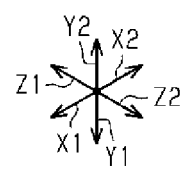

As shown in FIGS. 1 and 2, a connector assembly 10 includes a first connector 20 and a second connector 100 attachable to and detachable from the first connector 20. The connector assembly 10 is provided in a vehicle. For example, the vehicle includes a plurality of in-vehicle devices such as a high-voltage battery and an inverter. The plurality of in-vehicle devices are connected via a wiring harness. The connector assembly 10 is provided on an end part of the wiring harness to be connected to the in-vehicle devices. The first connector 20 and the second connector 100 are assembled with each other in an assembly direction D1. The second connector 100 is, for example, connected to the first connector 20 along the assembly direction D1. If the second connector 100 is properly connected to the first connector 20, the first and second connectors 20, 100 are electrically connected to each other. Note that the assembly direction D1 indicates a relative assembly direction of the second connector 100 with the first connector 20, and the first connector 20 is not limited as a fixed side. Further, a vertical direction in each figure does not necessarily indicate postures during the use of the first and second connectors 20, 100.

(Configuration of First Connector 20)

Figure 3:
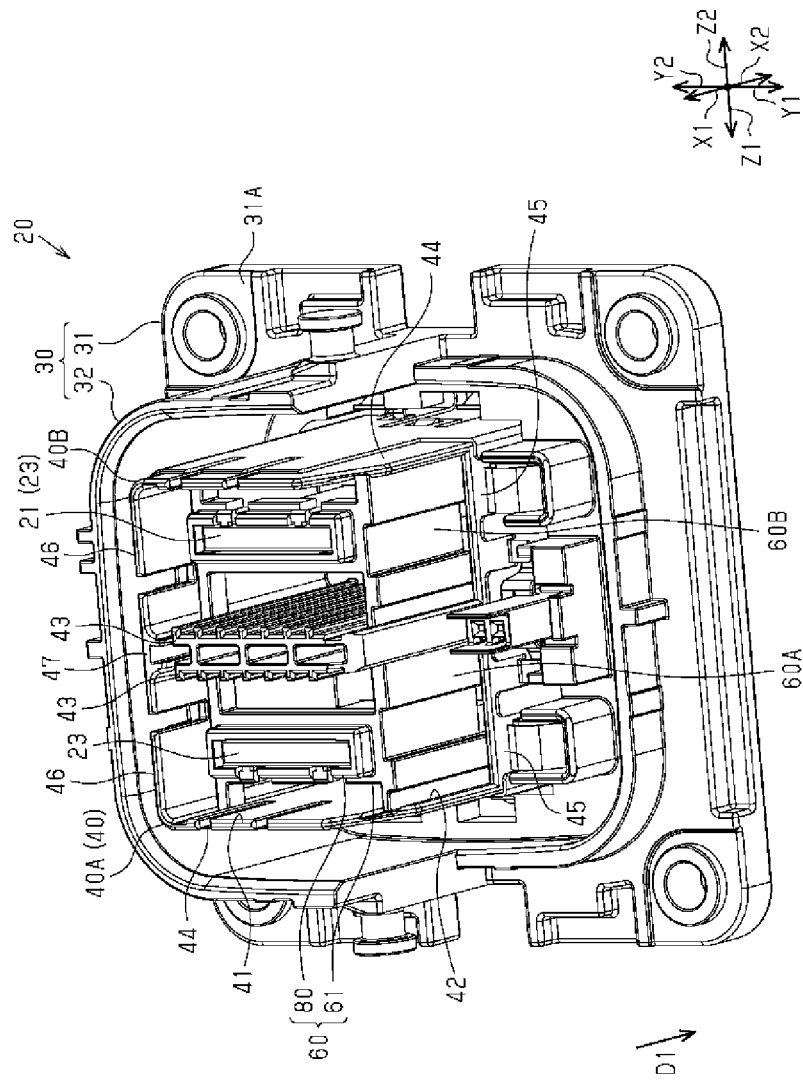
FIG. 3 is a schematic perspective view showing a first connector of the embodiment.
Figure 4:
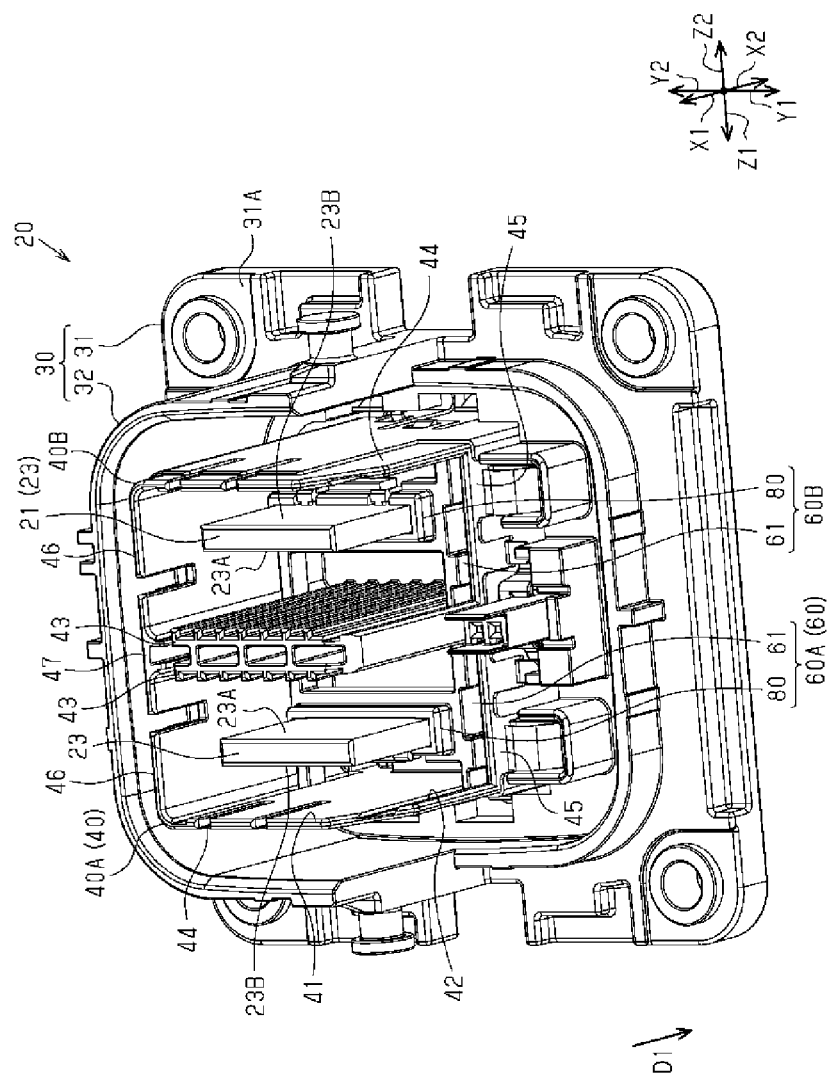
FIG. 4 is a schematic perspective view showing the first connector of the embodiment.

As shown in FIGS. 3 and 4, the first connector 20 includes one or more (two in this embodiment) first terminals 21 made of metal, a first connector housing 30 for holding the first terminals 21 and slide members 60. The slide members 60 are held in the first connector housing 30.

(Configuration of First Terminals 21)

Figure 5:
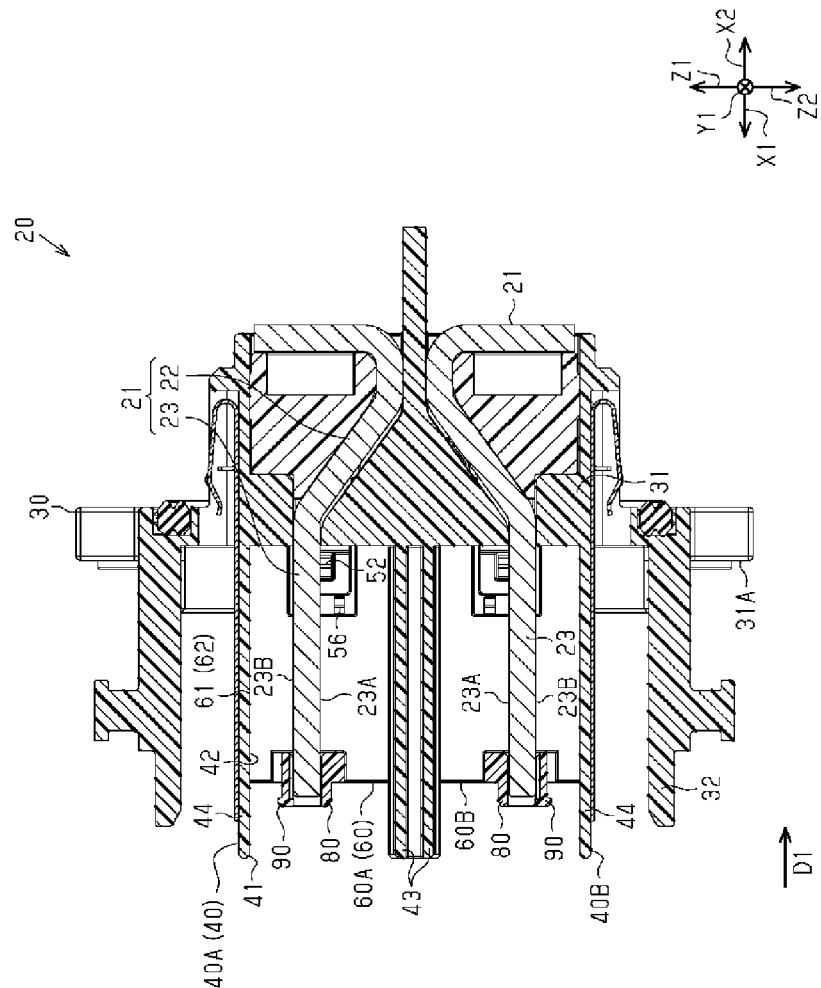
FIG. 5 is a schematic section (section along 5-5 in FIG. 8) showing the first connector of the embodiment.

As shown in FIG. 5, each first terminal 21 includes a basis portion 22 and a connecting portion 23 extending from the basis portion 22 in a first direction X1. A tip part of the connecting portion 23, i.e. a tip part of each first terminal 21, extends from the basis portion 22 in the first direction X1. In this embodiment, an extending direction of the tip part of the first terminal 21 is defined as the first direction X1, and a direction opposite to the first direction X1 is defined as a first opposite direction X2. Note that the first direction X1 and the first opposite direction X2 of this embodiment are directions parallel to the assembly direction D1. The first terminal 21 is, for example, a single component in which the basis portion 22 and the connecting portion 23 are continuously and integrally formed. The first terminal 21 is, for example, formed by press-working a metal plate material made of copper, copper alloy, aluminum, aluminum alloy or the like.

As shown in FIG. 4, the connecting portion 23 is in the form of a flat plate. An axial direction of the connecting portion 23 extends along the first direction X1. A width direction of the connecting portion 23 extends along a second direction Y1 orthogonal to the first direction X1. A thickness direction of the connecting portion 23 extends along a third direction Z1 orthogonal to both the first and second directions X1, Y1. One end surface in the width direction of the connecting portion 23 is facing in the second direction Y1, and the other end surface in the width direction of the connecting portion 23 is facing in a second opposite direction Y2, which is an opposite direction of the second direction Y1. One end surface in the thickness direction of the connecting portion 23 is facing in the third direction Z1, and the other end surface in the thickness direction of the connecting portion 23 is facing in a third opposite direction Z2, which is an opposite direction of the third direction Z1.

Out of the both end surfaces in the thickness direction of the connecting portion 23, the one end surface is a connection surface 23A to be connected to a second terminal 101 (see FIG. 1) of the second connector 100, and the other end surface in the thickness direction of the connecting portion 23 is a non-connection surface 23B not to be connected to the second terminal 101.

Figure 6:
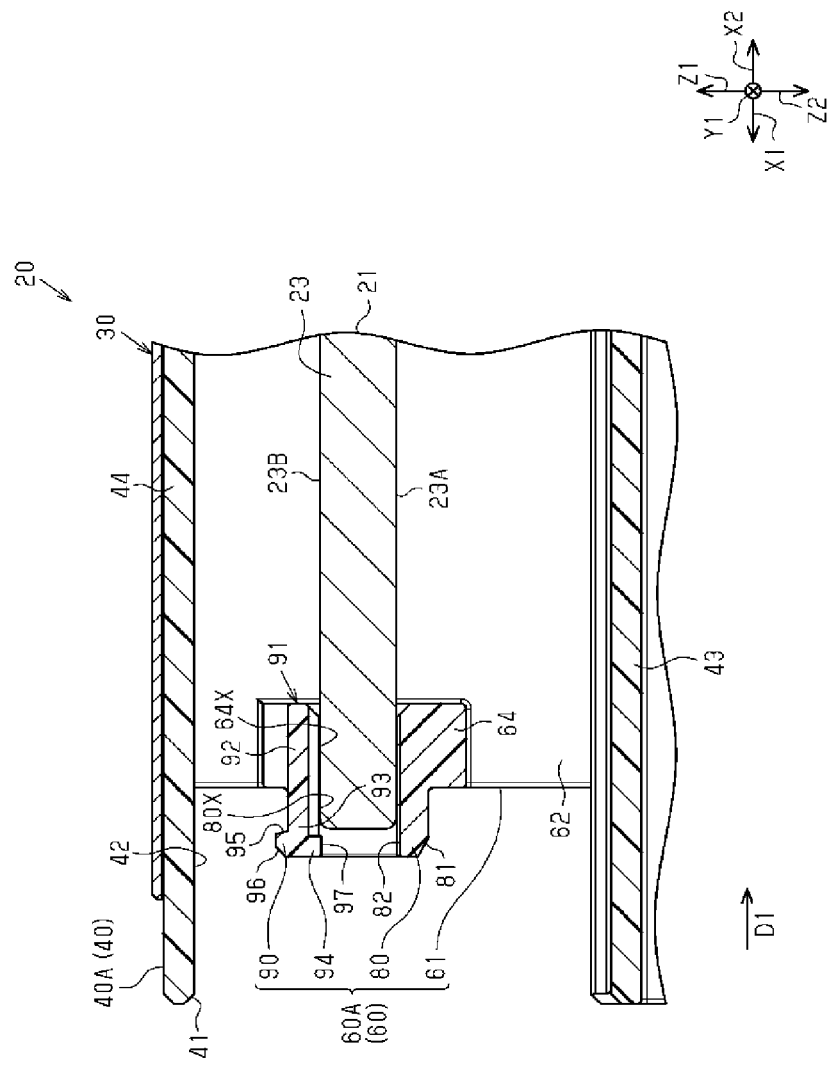
FIG. 6 is a schematic section enlargedly showing a part of the first connector of the embodiment.

As shown in FIGS. 5 and 6, the connection surface 23A is formed into a flat surface extending in parallel to the first direction X1. The non-connection surface 23B is formed into a flat surface extending in parallel to the first direction X1. Note that FIG. 6 enlargedly shows a part of the first connector 20 shown in FIG. 5.

As shown in FIG. 5, the two first terminals 21 are provided side by side in the third direction Z1. The two first terminals 21 are, for example, so arranged that two connection surfaces 23A face each other in the third direction Z1.

(Configuration of First Connector Housing 30)

As shown in FIGS. 3 and 4, the first connector housing 30 includes, for example, a basis portion 31, a peripheral wall portion 32 extending from the basis portion 31 in the first direction X1 and protecting portions 40 extending from the basis portion 31 in the first direction X1 inside the peripheral wall portion 32. The first connector housing 30 is, for example, a single component in which the basis portion 31, the peripheral wall portion 32 and the protecting portions 40 are integrally formed. The first connector housing 30 is, for example, made of an insulating resin material.

(Configuration of Base Portion 31)

The basis portion 31 holds the basis portions 22 (see FIG. 5) of the first terminals 21. The basis portion 31 includes, for example, a fixing portion 31A projecting further outward than the peripheral wall portion 32. The fixing portion 31A is, for example, fixed to a case of an unillustrated in-vehicle device.

(Configuration of Peripheral Wall Portion 32)

The peripheral wall portion 32 is formed into a partially cut ring shape. The peripheral wall portion 32 is, for example, formed into a rectangular ring shape extending in the first direction X1 as a whole. The peripheral wall portion 32 is, for example, cut on the first direction X1 side in surfaces on the second direction Y1 side in the rectangular ring shape. The peripheral wall portion 32 collectively surrounds the outer peripheries of the two first terminals 21.

(Configuration of Protecting Portions 40)

The protecting portions 40 include two protecting portions 40A, 40B for individually protecting the two first terminals 21. Each protecting portion 40A, 40B surrounds the outer periphery of each first terminal 21. The protecting portion 40A surrounds the outer periphery of the first terminal 21 arranged on the third direction Z1 side, out of the two first terminals 21, i.e. the first terminal 21 on a left side in figures. The protecting portion 40B surrounds the outer periphery of the first terminal 21 arranged on the third opposite direction Z2 side, out of the two first terminals 21, i.e. the first terminal 21 on a right side in the figures.

Each protecting portion 40A, 40B is formed into a partially cut ring shape. Each protecting portion 40A, 40B is, for example, formed into a rectangular ring shape extending in the first direction X1 as a whole. Each protecting portion 40A, 40B is formed to cover a part of the first terminal 21 in directions orthogonal to the first direction X1 except the second direction Y1. Each protecting portion 40A, 40B is cut on the first direction X1 side in surfaces on the second direction Y1 side in the rectangular ring shape. By this configuration, each protecting portion 40A, 40B includes a first opening 41 open in the first direction X1 and a second opening 42 open in the second direction Y1. The tip of each protecting portion 40A, 40B projects further in the first direction X1 than that of the first terminal 21.

Figure 7:
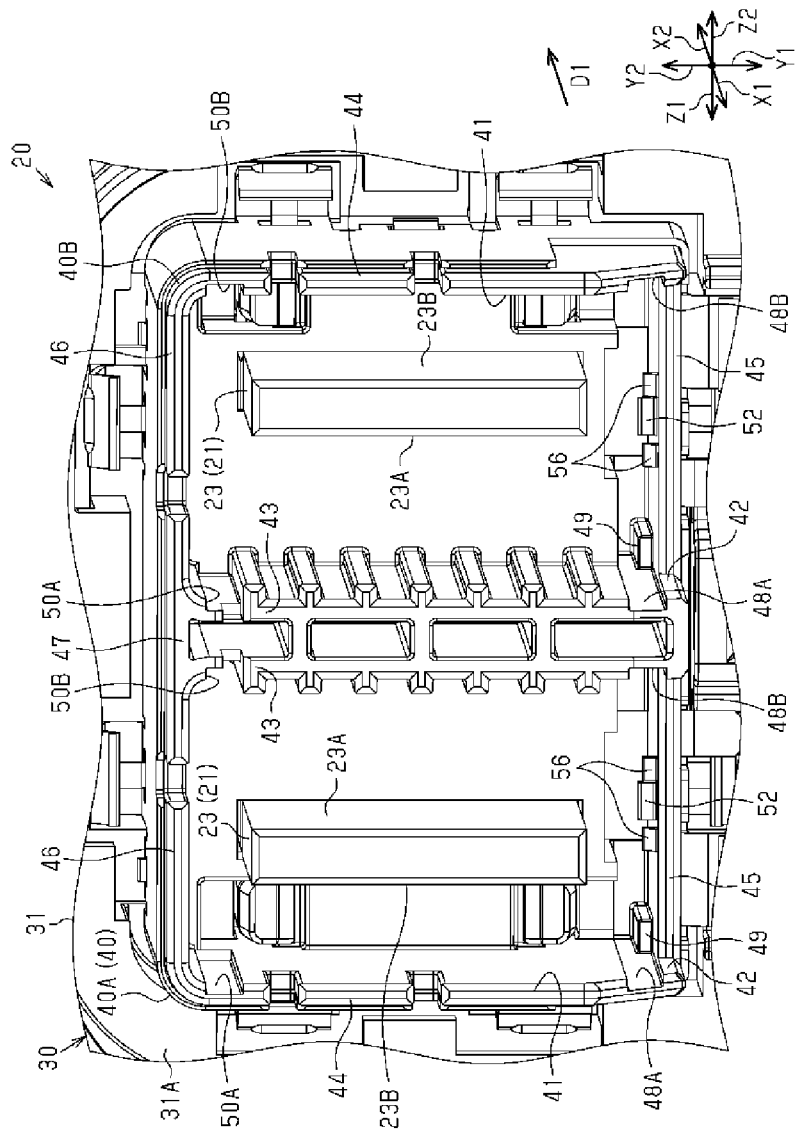
FIG. 7 is a schematic perspective view enlargedly showing a part of the first connector of the embodiment.

As shown in FIG. 7, each protecting portion 40A, 40B includes a pair of side walls 43, 44, a lower wall 45 and an upper wall 46. The side walls 43, 44 are facing each other in the third direction Z1. The inner surface of the side wall 43 is facing the connection surface 23A of the connecting portion 23. The inner surface of the side wall 44 is facing the non-connection surface 23B of the connecting portion 23. The lower wall 45 is a peripheral wall on the second direction Y1 side in each protecting portion 40A, 40B having a rectangular ring shape. The upper wall 46 is a peripheral wall on the second opposite direction Y2 side in each protecting portion 40A, 40B having a rectangular ring shape. The second opening 42 is provided in the lower wall 45. The second opening 42 is formed by cutting the lower wall 45 on the first direction X1 side. The second opening 42 is surrounded by the pair of side walls 43, 44 and the lower wall 45.

The two protecting portions 40A, 40B are provided side by side along the third direction Z1. In this embodiment, both the side wall 43 of the protecting portion 40A and the side wall 43 of the protecting portion 40B are provided between the two first terminals 21 in the third direction Z1. The side wall 43 of the protecting portion 40A and the side wall 43 of the protecting portion 40B are, for example, integrally formed by a coupling wall 47.

Each protecting portion 40A, 40B includes a pair of guide grooves 48A, 48B provided in the pair of side walls 43, 44 constituting the second opening 42. The guide grooves 48A, 48B are facing each other in the third direction Z1. For example, one guide groove 48A is provided in the inner surface of the side wall on the third direction Z1 side, out of the pair of side walls 43, 44, and the other guide groove 48A is provided in the inner surface of the side wall on the third opposite direction Z2 side, out of the pair of side walls 43, 44. In particular, in the protecting portion 40A, the guide groove 48A is provided in the inner surface of the side wall 44 and the guide groove 48B is provided in the inner surface of the side wall 43. In the protecting portion 40B, the guide groove 48A is provided in the inner surface of the side wall 43 and the guide groove 48B is provided in the inner surface of the side wall 44. The guide grooves 48A, 48B are provided in the inner surfaces of the side walls 43, 44 on the second direction Y1 side. The guide grooves 48A, 48B extend along the first opposite direction X2 from a tip part of each protecting portion 40A, 40B.

Figure 8:
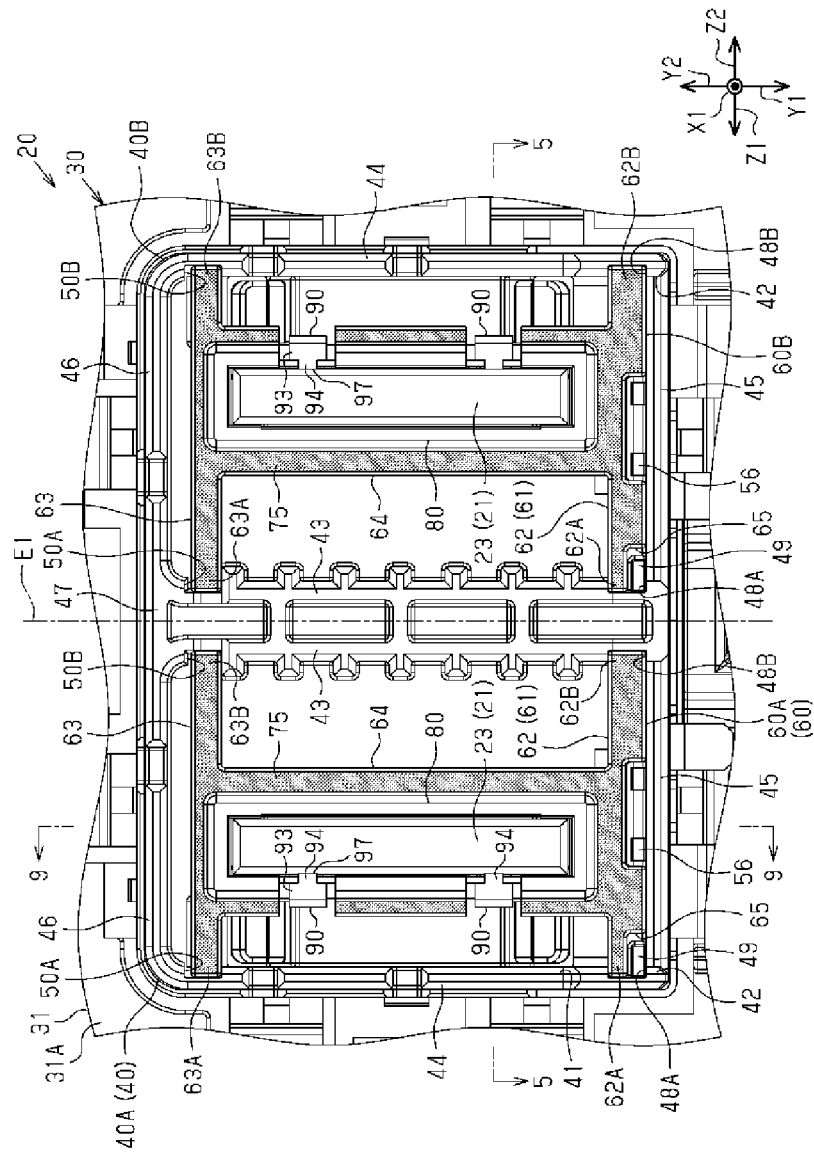
FIG. 8 is a schematic plan view enlargedly showing a part of the first connector of the embodiment.

As shown in FIGS. 7 and 8, one guide groove 48A and the other guide groove 48B are formed to have mutually different shapes. For example, the guide groove 48A includes a protrusion 49, whereas the guide groove 48B does not include the protrusion 49. As shown in FIG. 7, the protrusion 49 is provided on the first opposite direction X2 side and the second direction Y1 side, out of the bottom wall of the guide groove 48A. The protrusion 49 extends, for example, in the first direction X1 from the basis portion 31. The protrusion 49 is, for example, formed on the bottom surface of the guide groove 48A and on the inner surface of the lower wall 45. Note that FIG. 7 shows a part of the first connector housing 30 in a state where the slide members 60 are not held.

Each protecting portion 40A, 40B includes a pair of guide grooves 50A, 50B provided in the pair of side walls 43, 44. The guide grooves 50A, 50B are facing each other in the third direction Z1. For example, one guide groove 50A is provided in the inner surface of the side wall on the third direction Z1 side, out of the pair of side walls 43, 44, and the other guide groove 50A is provided in the inner surface of the side wall on the third opposite direction Z2 side, out of the pair of side walls 43, 44. In particular, in the protecting portion 40A, the guide groove 50A is provided in the inner surface of the side wall 44 and the guide groove 50B is provided in the inner surface of the side wall 43. In the protecting portion 40B, the guide groove 50A is provided in the inner surface of the side wall 43 and the guide groove 50B is provided in the inner surface of the side wall 44. The guide grooves 50A, 50B are provided in the inner surfaces of the side walls 43, 44 on the second opposite direction Y2 side. The guide grooves 50A, 50B extend along the first opposite direction X2 from the tip part of each protecting portion 40A, 40B.

Figure 9:
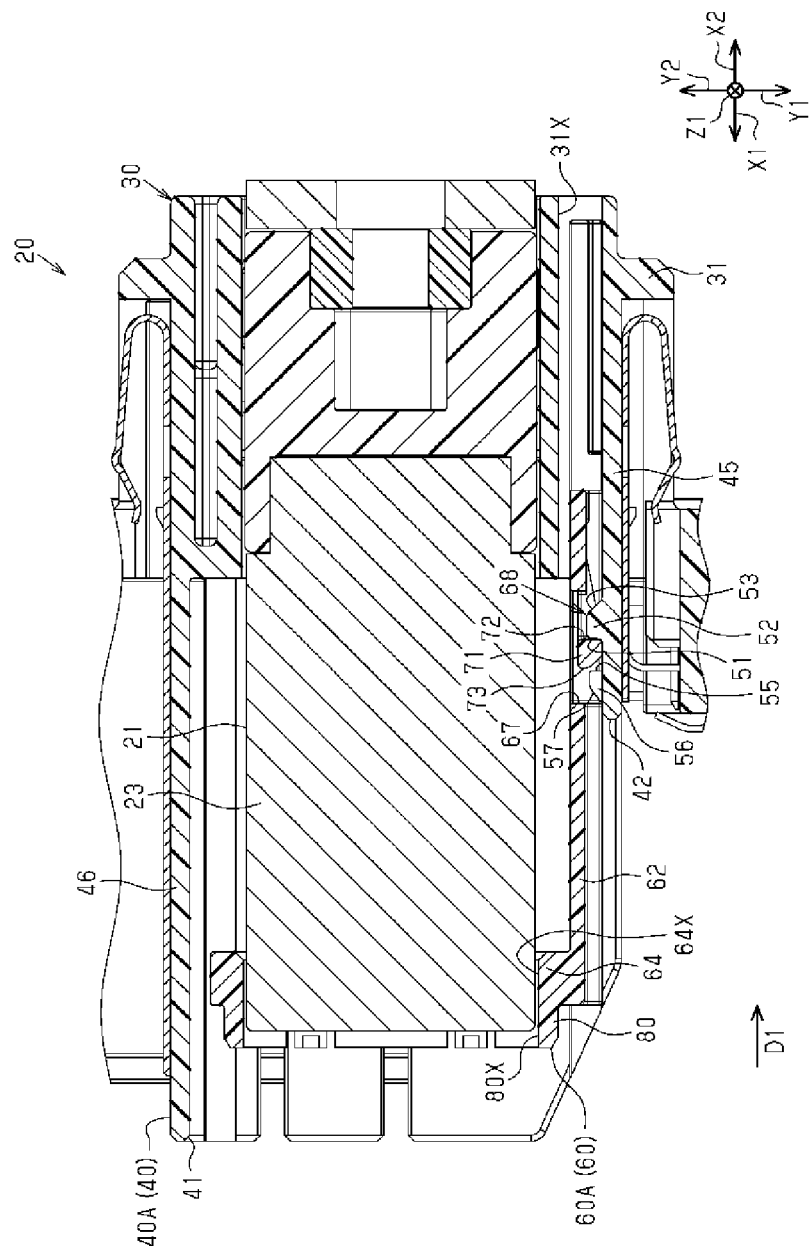
FIG. 9 is a schematic section (section along 9-9 in FIG. 8) enlargedly showing a part of the first connector of the embodiment.
Figure 10:
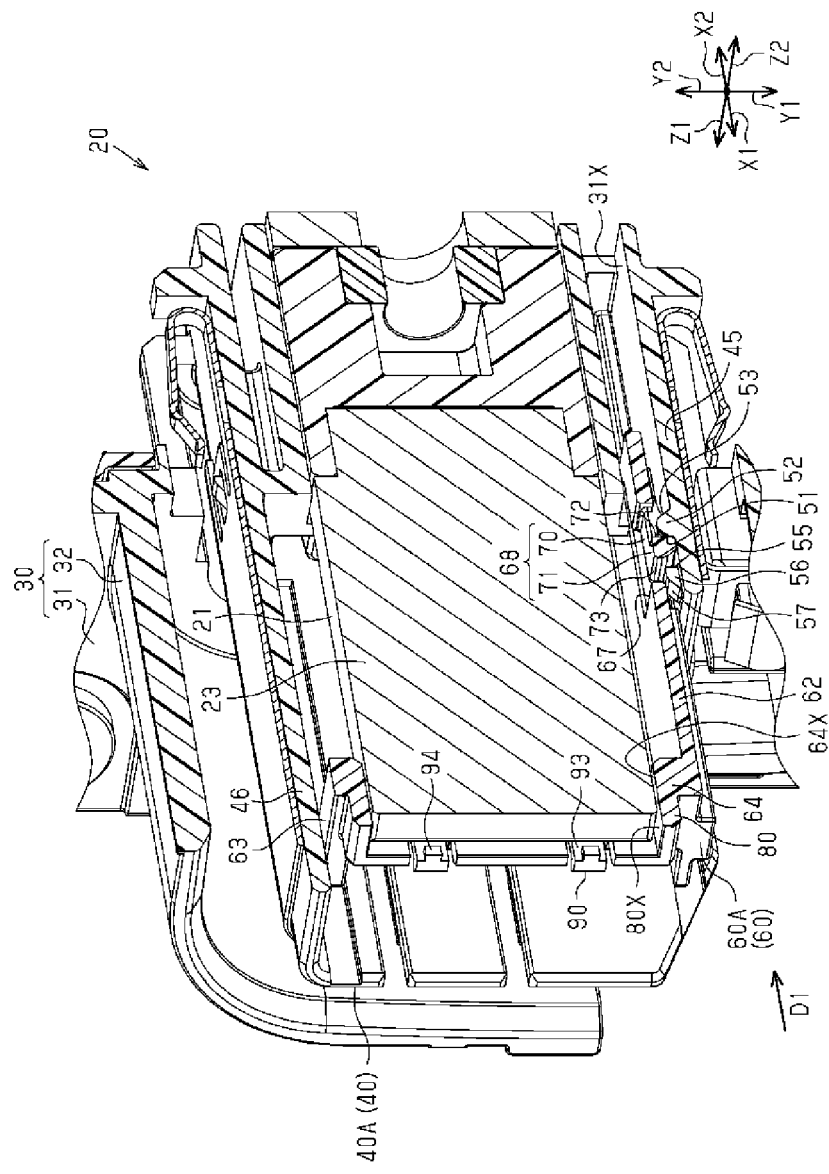
FIG. 10 is a schematic perspective view partly in section showing the first connector of the embodiment.

As shown in FIGS. 9 and 10, each protecting portion 40A, 40B includes, for example, a connector-side suppressing portion 51 and connector-side restricting portions 55. The connector-side suppressing portion 51 and the connector-side restricting portions 55 are, for example, provided on the inner surface of the lower wall 45 of each protecting portion 40A, 40B.

(Configuration of Connector-Side Suppressing Portion 51)

Each lower wall 45 includes a suppressing protrusion 52 projecting in the second opposite direction Y2 from the inner surface of the lower wall 45. A surface facing in the first direction X1 in the suppressing protrusion 52 constitutes the connector-side suppressing portion 51. The connector-side suppressing portion 51 is formed into an inclined surface slightly inclined in the first opposite direction X2 toward the top of the suppressing protrusion 52. A surface facing in the first opposite direction X2 in the suppressing protrusion 52 is formed into an inclined surface 53 inclined in the first direction X1 toward the top of the suppressing protrusion 52.

(Configuration of Connector-Side Restricting Portions 55)

As shown in FIG. 7, each lower wall 45 includes one or more (two in this embodiment) restricting protrusions 56 projecting in the second opposite direction Y2 from the inner surface of the lower wall 45. The two restricting protrusions 56 are, for example, provided to sandwich the suppressing protrusion 52 in the third direction Z1. As shown in FIGS. 9 and 10, each restricting protrusion 56 is provided on a side further in the first direction X1 than the suppressing protrusion 52. A surface facing in the first opposite direction X2 in each restricting protrusion 56 constitutes the connector-side restricting portion 55. The connector-side restricting portion 55 is, for example, formed to extend perpendicular from the inner surface of the lower wall 45. For example, the connector-side restricting portion 55 is formed on a plane orthogonal to the first direction X1. A surface facing in the first direction X1 in each restricting protrusion 56 is formed into an inclined surface 57 inclined in the first opposite direction X2 toward the top of the restricting protrusion 56.

As shown in FIG. 8, in the first connector housing 30 of this embodiment, the protecting portions 40A, 40B are coupled and integrated by the coupling wall 47. The protecting portions 40A, 40B are, for example, formed asymmetrically with respect to a virtual line E1 extending in the second direction Y1 through the coupling wall 47 in a plan view from the first direction X1. For example, in the protecting portions 40A, 40B, the protrusions 49 are provided at positions asymmetrical with respect to the virtual line E1. Inside each protecting portion 40A, 40B, the connecting portion 23 of the first terminal 21 is held closer to the side wall 44, out of the side walls 43, 44, in the third direction Z1.

(Configuration of Slide Members 60)

The slide members 60 include two slide members 60A, 60B to be individually mounted into the two protecting portions 40A, 40B. The slide member 60A is mounted in the protecting portion 40A. The slide member 60B is mounted in the protecting portion 40B.

As shown in FIGS. 3 and 4, each slide member 60A, 60B is slidable between a closing position for closing the second opening 42 (see FIG. 3) and an opening position (see FIG. 4) in the first opposite direction X2. Here, the closing position for closing the second opening 42 may be a position where the second opening 42 can be closed to such an extent that a finger does not reach the first terminal 21 through the second opening 42, and the slide member 60A, 60B does not necessarily seal the second opening 42 also at the closing position. Further, the opening position is a position for opening the second opening 42. Note that each slide member 60A, 60B is, for example, made of an insulating resin material.

As shown in FIG. 8, a planar shape of each slide member 60A, 60B when viewed from the first direction X1 is formed point-asymmetrically with respect to a center axis of each slide member 60A, 60B extending in parallel to the first direction X1. The planar shape of each slide member 60A, 60B when viewed from the first direction X1 is a shape having no axis of rotational symmetry. Further, the slide members 60A, 60B are formed to have mutually different shapes. The slide members 60A, 60B are, for example, formed asymmetrically with respect to the virtual line E1 in a plan view from the first direction X1.

(Configuration of Slide Member 60A)

First, a specific configuration of the slide member 60A is described.

Figure 11:
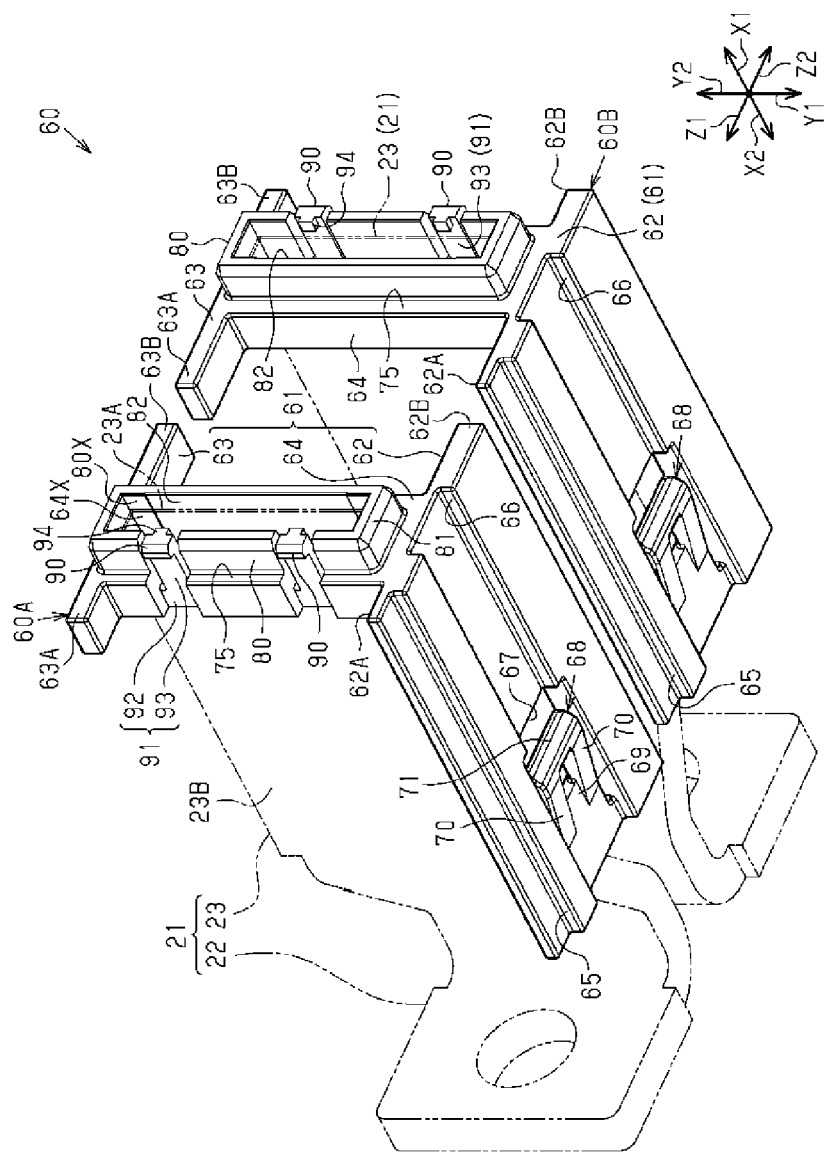
FIG. 11 is a schematic perspective view showing slide members of the embodiment.
Figure 12:
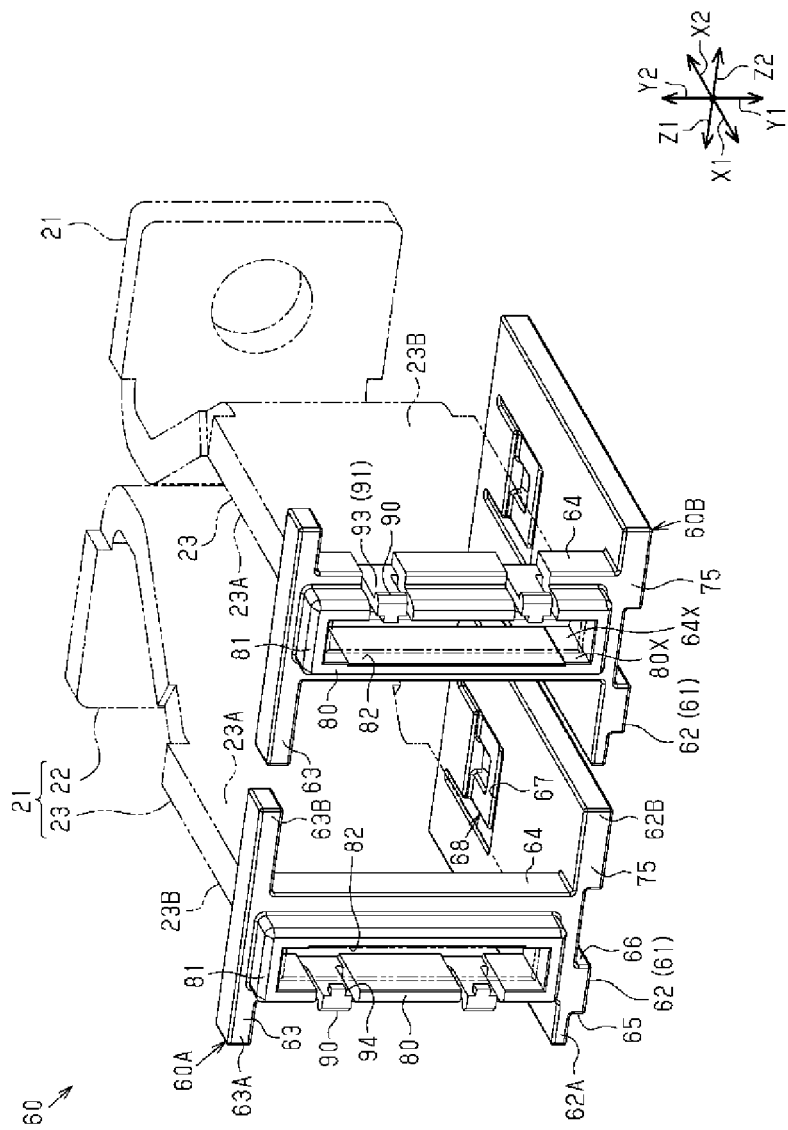
FIG. 12 is a schematic perspective view showing the slide members of the embodiment.

As shown in FIGS. 11 and 12, the slide member 60A includes, for example, a slide body portion 61, a tip protecting portion 80 for protecting a tip part of the first terminal 21 and engaged portions 90. The slide member 60A is a single component in which the slide body portion 61, the tip protecting portion 80 and the engaged portions 90 are integrally formed. The following description is centered on the structure of the slide member 60A at the closing position.

(Configuration of Slide Body Portion 61)

The slide body portion 61 includes a base portion 62, a base portion 63 provided apart from the base portion 62 and a coupling portion 64 coupling the base portions 62 and 63. The planar shape of the slide body portion 61 when viewed from the first direction X1 is, for example, H-shaped as a whole.

The base portion 62 is plate-like. An axial direction of the base portion 62 extends along the first direction X1. A width direction of the base portion 62 extends in the third direction Z1, and a thickness direction of the base portion 62 extends in the second direction Y1.

As shown in FIG. 8, the base portion 62 includes a pair of guide portions 62A, 62B to be respectively fit into the pair of guide grooves 48A, 48B of the protecting portion 40A. The slide body portion 61 is slidable in the first direction X1 and the first opposite direction X2 by the guide portions 62A, 62B being respectively guided by the guide grooves 48A, 48B. The guide portions 62A, 62B are provided on both end parts in the width direction of the base portion 62. The guide portion 62A is provided on the end part on the third direction Z1 side in the width direction of the base portion 62. The guide portion 62B is provided on the end part on the third opposite direction Z2 side in the width direction of the base portion 62.

As shown in FIG. 11, the guide portions 62A, 62B are formed to have mutually different shapes. The guide portion 62A is, for example, formed to be thinner than the guide portion 62B. The guide portion 62A is, for example, formed to be thinner than the guide portion 62B by including a groove portion 65. The groove portion 65 is formed to be recessed in the second opposite direction Y2 from an end surface of the base portion 62 on the second direction Y1 side in the thickness direction. The groove portion 65 extends along the first direction X1. The groove portion 65 extends over the entire length in the axial direction of the base portion 62. As shown in FIG. 8, one guide portion 62A can be fit into the guide groove 48A including the protrusion 49 by including the groove portion 65, and the other guide portion 62B cannot be fit into the guide groove 48A. In this way, the slide member 60A is prevented from being erroneously assembled with the first connector housing 30.

As shown in FIG. 11, the base portion 62 includes a groove portion 66 provided in a central part in the width direction of the base portion 62. The groove portion 66 is formed to be recessed in the second opposite direction Y2 from the end surface of the base portion 62 on the second direction Y1 side in the thickness direction. The groove portion 66 extends along the first direction X1. The groove portion 66 extends over the entire length in the axial direction of the base portion 62.

The base portion 62 includes, for example, a through portion 67 penetrating in the thickness direction of the base portion 62, i.e. in the second direction Y1, and an engaging piece 68 extending from an inner edge part of the through portion 67 in an intermediate part in the axial direction of the groove portion 66. The through portion 67 is, for example, provided at a position further in the first opposite direction X2 than a central part in the width direction of the groove portion 66. The engaging piece 68 includes a base piece 69, two side pieces 70 and a coupling piece 71. The base piece 69 extends in the first direction X1 from the inner edge part of the through portion 67 on the first opposite direction X2 side. The respective side pieces 70 extend in the first direction X1 while forming slight steps in the second direction Y1 from both sides of a tip part of the base piece 69. The coupling piece 71 couples tip parts of the two side pieces 70.

As shown in FIG. 9, a surface facing in the first opposite direction X2 in the coupling piece 71 functions as a slide-side suppressing portion 72 for suppressing a movement of the slide member 60A in the first opposite direction X2 by being engaged with the connector-side suppressing portion 51. The slide-side suppressing portion 72 is, for example, formed on a plane orthogonal to the first direction X1. The slide-side suppressing portion 72 is engaged with the connector-side suppressing portion 51, i.e. the surface facing in the first direction X2 in the suppressing protrusion 52, with the slide member 60A located at the closing position. By the engagement of the slide-side suppressing portion 72 with the connector-side suppressing portion 51, a movement of the slide member 60A in the first opposite direction X2 is suppressed and the slide member 60A is kept at the closing position. A movement of the slide member 60A in the first opposite direction X2 is suppressed by the engagement of the slide-side suppressing portion 72 with the connector-side suppressing portion 51 even if a force is applied in the first opposite direction X2 at the closing position until a force of a set value or greater is applied. If a force of the set value or greater is applied in the first opposite direction X2 at the closing position, the engaging piece 68 is deflected and the coupling piece 71 rides over the suppressing protrusion 52, the slide-side suppressing portion 72 is disengaged from the connector-side suppressing portion 51 and the slide member 60A moves in the first opposite direction X2. At this time, the base portion 62 is inserted into an insertion hole 31X provided in the basis portion 31.

As shown in FIG. 10, surfaces facing in the first direction X1 in the both side pieces 70 of the engaging piece 68 function as slide-side restricting portions 73 for restricting a movement of the slide member 60A in the first direction X1 by being engaged with the connector-side restricting portions 55. The slide-side restricting portions 73 are, for example, formed on a plane orthogonal to the first direction X1. The slide-side restricting portions 73 are engaged with the connector-side restricting portions 55, i.e. the surfaces facing in the first opposite direction X2 of the restricting protrusions 56, with the slide member 60A located at the closing position. By the engagement of the slide-side restricting portions 73 with the connector-side restricting portions 55, a movement of the slide member 60A in the first direction X1 is suppressed and the slide member 60A is kept at the closing position. A movement of the slide member 60A in the first direction X1 is restricted by the engagement of the slide-side restricting portions 73 with the connector-side restricting portions 55 even if a force is applied in the first direction X1 at the closing position. At this time, since the slide-side restricting portions 73 and the connector-side restricting portions 55 in the form of flat surfaces orthogonal to the first direction X1 are engaged, it is suppressed that the engaging piece 68 is deflected and the both side pieces 70 ride over the restricting protrusions 56. In this way, the detachment of the slide member 60A from the first connector housing 30 is suppressed.

As shown in FIGS. 11 and 12, the base portion 63 is, for example, provided at a position distant from the base portion 62 in the second opposite direction Y2. The base portion 63 is plate-like. The base portion 63 is, for example, shorter than the base portion 62 in the first direction X1. The base portion 63 is, for example, facing the base portion 62 in the second direction Y1. The base portion 63 is, for example, facing in parallel to the base portion 62. For the sake of convenience, an axial direction of the base portion 63 is a direction extending in the first direction X1, a width direction of the base portion 63 is a direction extending in the third direction Z1 and a thickness direction of the base portion 63 is a direction extending in the second direction Y1 below. The base portion 63 of this embodiment is provided at a position facing a tip part of the base portion 62, i.e. an end part of the base portion 62 on the first direction X1 side.

As shown in FIG. 8, the base portion 63 includes a pair of guide portions 63A, 63B to be respectively fit into the pair of guide grooves 50A, 50B of the protecting portion 40A. The slide body portion 61 is slidable in the first direction X1 and the first opposite direction X2 by the guide portions 63A, 63B being respectively guided by the guide grooves 50A, 50B. The guide portions 63A, 63B are provided on both end parts in the width direction of the base portion 63. The guide portion 63A is provided on an end part on the third direction Z1 side in the width direction of the base portion 63. The guide portion 63B is provided on an end part on the third opposite direction Z2 side in the width direction of the base portion 63. The guide portions 63A, 63B are formed to have the same shape. For example, a thickness of the guide portion 63A is equal to that of the guide portion 63B, and a length along the axial direction of the guide portion 63A is equal to that of the guide portion 63B. Note that, in this specification, "equal" means not only a precisely equal case, but also a case where objects to be compared are slightly different due to dimensional tolerances and the like. The pair of guide portions 63A, 63B are, for example, formed to have the shape different from those of the pair of guide portions 62A, 62B.

As shown in FIG. 11, the coupling portion 64 extends from the base portion 62 to the base portion 63 in the second opposite direction Y2. The coupling portion 64 couples the tip part of the base portion 62 and that of the base portion 63. The coupling portion 64 has a predetermined thickness along the first direction X1. A dimension in the first direction X1 of the coupling portion 64 is, for example, equal to that of the base portion 63. The coupling portion 64 is provided in intermediate parts in the width direction of the base portions 62, 63. The coupling portion 64 is provided slightly closer to the guide portions 62A, 63A, i.e. the third direction Z1 side than widthwise centers in the width directions of the base portions 62, 63. Thus, projecting amounts of the base portions 62, 63 in the third opposite direction Z2 from a surface facing in the third opposite direction Z2 in the coupling portion 64 are larger than those of the base portions 62, 63 in the third direction Z1 from a surface facing in the third direction Z1 in the coupling portion 64.

The coupling portion 64 is formed into a ring shape to surround the connecting portion 23 of the first terminal 21. The coupling portion 64 surrounds the outer periphery of the connecting portion 23 over an entire periphery in a circumferential direction. The coupling portion 64 includes a through hole 64X, through which the connecting portion 23 is passed. The coupling portion 64 is formed into a ring shape by including the through hole 64X. The through hole 64X has an inner peripheral surface corresponding to the outer peripheral surface of the connecting portion 23. The coupling portion 64 is, for example, formed into such a rectangular ring shape that an outer edge shape and an inner peripheral shape of the through hole 64X are rectangular.

Here, as shown in FIG. 8, the tip surface of the base portion 62, that of the base portion 63 and that of the coupling portion 64 function as a pressed portion 75 to be pressed by a pressing portion 130 (see FIG. 17) provided in the second connector 100 when the first and second connectors 20, 100 are assembled. The slide member 60A slides to the opening position, for example, by the pressed portion 75 being pressed by the pressing portion 130. The pressed portion 75 is, for example, formed in an H shape in a plan view from the first direction X1. Note that a region functioning as the pressed portion 75 is dotted in FIG. 8.

(Configuration of Tip Protecting Portion 80)

As shown in FIGS. 11 and 12, the tip protecting portion 80 is integrally formed to the tip surface of the slide body portion 61. The tip protecting portion 80 is, for example, integrally formed to the tip surface of the coupling portion 64. The tip protecting portion 80 is, for example, formed to project further in the first direction X1 than the pressed portion 75. The tip protecting portion 80 projects in the first direction X1 from the tip surface of the coupling portion 64. When the slide body portion 61 slides along the first direction X1 and the first opposite direction X2, the tip protecting portion 80 slides along the first direction X1 and the first opposite direction X2 together with the slide body portion 61. As shown in FIG. 3, the tip protecting portion 80 is arranged at a protection position for protecting the tip part of the connecting portion 23 with the slide member 60A located at the closing position. As shown in FIG. 4, the tip protecting portion 80 is arranged at an exposure position for exposing the tip part of the connecting portion 23 and the connection surface 23A of the connecting portion 23 with the slide member 60A located at the opening position. The tip protecting portion 80 is, for example, arranged closer to the first opposite direction X2 side than a connected part of the connection surface 23A and the second terminal 101 (see FIG. 2) of the second connector 100 with the slide member 60A located at the opening position. As just described, the tip protecting portion 80 is slidable between the protection position (see FIG. 3) and the exposure position (see FIG. 4) according to a sliding movement of the slide body portion 61. The following description is centered on the structure of the tip protecting portion 80 at the protection position, i.e. the structure of the tip protecting portion 80 with the slide member 60A located at the closing position.

As shown in FIG. 11, the tip protecting portion 80 is formed into a ring shape to surround the tip part of the connecting portion 23. The tip protecting portion 80 surrounds the outer periphery of the tip part of the connecting portion 23 over the entire periphery in the circumferential direction. The tip protecting portion 80 includes a through hole 80X, through which the connecting portion 23 is passed. The tip protecting portion 80 is formed into a ring shape by including the through hole 80X. The through hole 80X has an inner peripheral surface corresponding to the outer peripheral surface of the connecting portion 23. The tip protecting portion 80 is, for example, formed into such a rectangular ring shape that an outer edge shape and an inner peripheral shape of the through hole 80X are rectangular. The through hole 80X communicates with the through hole 64X. The inner peripheral surface of the through hole 80X is, for example, continuously formed without any step between this inner peripheral surface and the inner peripheral surface of the through hole 64X. The outer peripheral surface of the tip protecting portion 80 is, for example, formed to be one size smaller than that of the coupling portion 64 in a planar shape viewed from the first direction X1. The tip protecting portion 80 is, for example, formed to expose a part of the tip surface of the coupling portion 64. In other words, the peripheral wall of the tip protecting portion 80 constituting the through hole 80X is formed to be thinner along the third direction Z1 than the peripheral wall of the coupling portion 64 constituting the through hole 64X.

As shown in FIG. 6, the tip protecting portion 80 projects further in the first direction X1 than the tip surface of the connecting portion 23. That is, the tip surface of the tip protecting portion 80 is provided at a position projecting further in the first direction X1 than the tip surface of the connecting portion 23. The outer peripheral surface of the tip part of the tip protecting portion 80 has an inclined surface 81 inclined to approach a center axis of the tip protecting portion 80 from a base end side (i.e. the side of the coupling portion 64) toward the tip surface of the tip protecting portion 80. The inclined surface 81 is, for example, formed on the outer peripheral surface of the tip protecting portion 80 in a part projecting further in the first direction X1 than the tip surface of the connecting portion 23. As shown in FIGS. 11 and 12, the inclined surface 81 is, for example, formed over the entire periphery of the tip protecting portion 80 in the circumferential direction.

A recess 82 is provided in the inner peripheral surface of the through hole 80X. The recess 82 is formed to be recessed radially outwardly of the tip protecting portion 80 from the inner peripheral surface of the through hole 80X. The recess 82 is provided in the inner peripheral surface on the third opposite direction Z2 side in the through hole 80X, i.e. the inner peripheral surface facing the connection surface 23A of the connecting portion 23, out of the inner peripheral surface of the through hole 80X. The recess 82 is provided in an intermediate part in the second direction Y1, out of the inner peripheral surface on the third opposite direction Z2 side in the through hole 80X. The recess 82 extends, for example, from the tip surface of the tip protecting portion 80 to the surface of the coupling portion 64 facing in the first opposite direction X2. That is, the recess 82 is formed also in the inner peripheral surface of the through hole 64X on the third opposite direction Z2 side, i.e. the inner peripheral surface facing the connection surface 23A, out of the inner peripheral surface of the through hole 64X. As shown in FIG. 6, the bottom surface of the recess 82 is facing the connection surface 23A. The bottom surface of the recess 82 is provided apart from the connection surface 23A in the third direction Z1. By providing the recess 82, the contact of the inner peripheral surfaces of the through holes 64X, 80X and the connection surface 23A can be suppressed. Thus, the wear of the connection surface 23A due to contact with the inner peripheral surfaces of the through holes 64X, 80X can be suppressed.

(Configuration of Engaged Portions 90)

Figure 13:
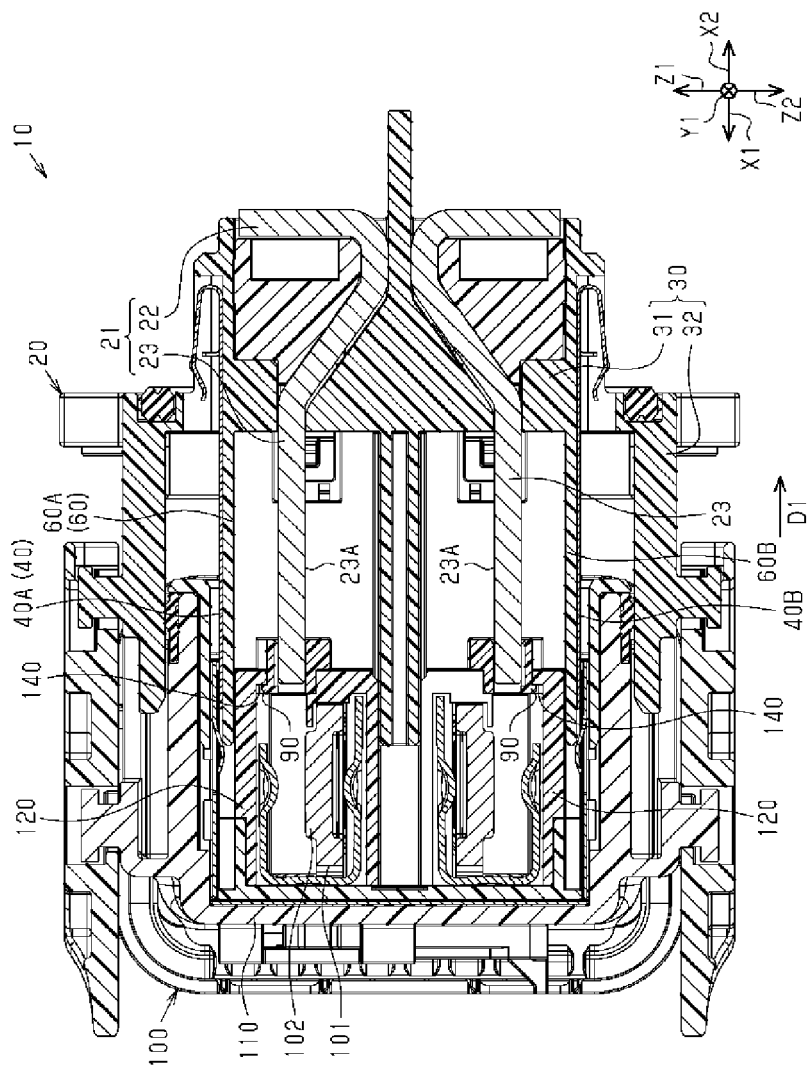
FIG. 13 is a schematic section showing the connector assembly of the embodiment.
Figure 14:
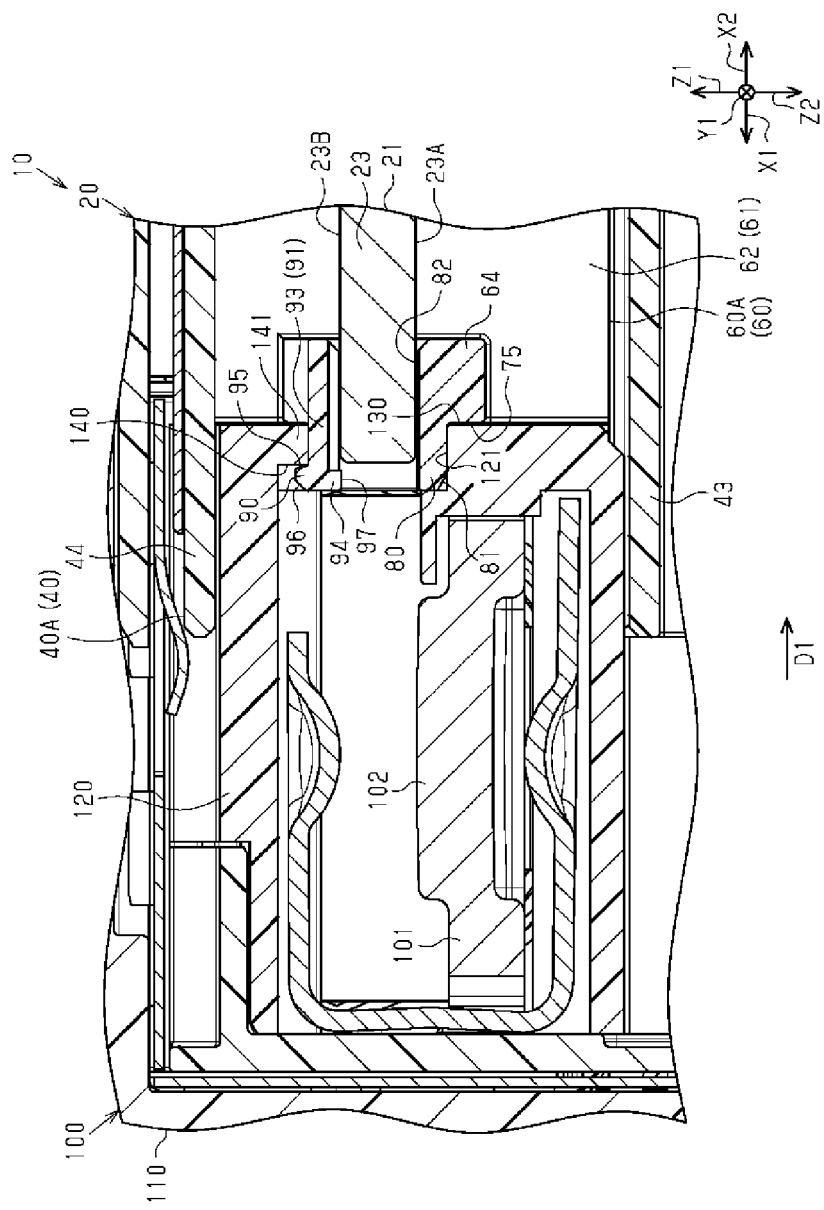
FIG. 14 is a schematic section enlargedly showing a part of the connector assembly of the embodiment.

As shown in FIGS. 13 and 14, the engaged portions 90 are parts to be pulled by the engaging portions 140 provided in the second connector 100 in detaching the second connector 100 from the first connector 20. The slide member 60A slides to the closing position by the engaged portions 90 being pushed by the engaging portions 140. Note that FIG. 14 enlargedly shows a part of the connector assembly 10 shown in FIG. 13.

As shown in FIGS. 11 and 12, the slide member 60A includes one or more (two in this embodiment) engaged pieces 91. The engaged portion 90 is provided on each of the two engaged pieces 91. Thus, the slide member 60A of this embodiment includes two engaged portions 90.

Each engaged piece 91 is, for example, provided on the coupling portion 64 and the tip protecting portion 80. Each engaged piece 91 is provided on the peripheral wall not facing the connection surface 23A of the connecting portion 23, out of the peripheral wall of the tip protecting portion 80. Each engaged piece 91 is, for example, provided on the peripheral wall on the third direction Z1 side in the tip protecting portion 80, i.e. the peripheral wall facing the non-connection surface 23B of the connecting portion 23, out of the peripheral wall of the tip protecting portion 80. Each engaged piece 91 is, for example, provided on the peripheral wall on the third direction Z1 side in the coupling portion 64, i.e. the peripheral wall facing the non-connection surface 23B, out of the peripheral wall of the coupling portion 64. Each engaged piece 91 is, for example, provided on a side opposite to the recess 82. Each engaged piece 91 is provided on the side opposite to the recess 82 across the first terminal 21 in the third direction Z1. Each engaged piece 91 is facing the recess 82. The two engaged pieces 91 are provided in intermediate parts in the second direction Y1, out of the peripheral wall on the third direction Z1 side in the tip protecting portion 80. The two engaged pieces 91 are provided apart from each other in the second direction Y1.

Each engaged piece 91 includes, for example, a basis portion 92, a flexible piece 93 extending in the first direction X1 from the basis portion 92, the engaged portion 90 provided on a tip part of the flexible piece 93 and a restricting protrusion 94 provided on a tip part of the flexible piece 93. The basis portion 92 is integrally coupled to a base end part of the coupling portion 64. A thickness along the third direction Z1 of the basis portion 92 is smaller than that of the peripheral wall of the coupling portion 64. The thickness along the third direction Z1 of the basis portion 92 is, for example, smaller than that of the peripheral wall of the tip protecting portion 80.

The flexible piece 93 includes a base end part connected to the basis portion 92 and a tip part provided on a side opposite to the base end part in the first direction X1. The flexible piece 93 is in the form of a cantilever having the base end part as a fixed end and the tip part as a free end. The flexible piece 93 is flexible in directions orthogonal to the first direction X1, i.e. the third direction Z1 and the third opposite direction Z2 in this embodiment. The flexible piece 93 is configured to be flexible in the third direction Z1 and the third opposite direction Z2 by being resiliently deformed. The flexible piece 93 is provided apart from the peripheral wall of the coupling portion 64 and the peripheral wall of the tip protecting portion 80. That is, a gap is provided between the outer surface of the flexible piece 93 and the peripheral wall of the coupling portion 64 and the peripheral wall of the tip protecting portion 80. In other words, a length along the second direction Y1 of the flexible piece 93 is shorter than that of the basis portion 92. Further, a thickness along the third direction Z1 of the flexible piece 93 is equal to that of the basis portion 92.

As shown in FIG. 14, the tip part of the flexible piece 93 projects further in the first direction X1 than the tip surface of the connecting portion 23. The tip part of the flexible piece 93 projects further in the first direction X1 than the tip surface of the connecting portion 23 to such an extent that the restricting protrusion 94 does not contact the connecting portion 23, for example, even if the flexible piece 23 is deflected in the third opposite direction Z2 with the slide member 60A located at the closing position. For example, the tip surface of the flexible piece 93 does not project further in the first direction X1 than that of the tip protecting portion 80. That is, the tip surface of the flexible piece 93 does not project further forward in the assembly direction D1, i.e. a direction approaching the second connector 100, than that of the tip protecting portion 80. In other words, the tip surface of the flexible piece 93 is formed on the same plane as that of the tip protecting portion 80 or provided at a position retracted in the first opposite direction X2 from that of the tip protecting portion 80. The tip surface of the flexible piece 93 in this embodiment is formed on the same plane as that of the tip protecting portion 80.

As shown in FIGS. 11 and 12, the engaged portion 90 projects in the third direction Z1. The engaged portion 90 projects in the third direction Z1 from an end surface facing in the third direction Z1 in the flexible piece 93. The engaged portion 90 does not project further in the third direction Z1 than the outer peripheral surface of the peripheral wall of the tip protecting portion 80 on the third direction Z1 side. The engaged portion 90 does not project further in the third direction Z1 than the outer peripheral surface of the peripheral wall on the third direction Z1 side in the coupling portion 64. The engaged portion 90 extends, for example, over the entire length in the second direction Y1 of the flexible piece 93.

As shown in FIG. 14, a surface facing in the first opposite direction X2 in the engaged portion 90 is formed into an inclined surface 95 inclined in the first direction X1 toward the top of the engaged portion 90. The inclined surface 95 is inclined with respect to a plane orthogonal to the assembly direction D1. The inclined surface 95 is, for example, provided on the entire surface facing in the first opposite direction X2 in the engaged portion 90. When the second connector 100 is detached from the first connector 20, the engaging portion 140 provided in the second connector 100 is engaged with the inclined surface 95 of the engaged portion 90. The inclined surface 95 guides the engaging portion 140 so that the engaging portion 140 and the engaged portion 90 are disengaged with the slide member 60A located at the closing position when the second connector 100 is detached from the first connector 20.

A surface facing in the first direction X1 in the engaged portion 90 is formed into an inclined surface 96 inclined in the first opposite direction X2 toward the top of the engaged portion 90. The inclined surface 96 is inclined with respect to a plane orthogonal to the assembly direction D1. The inclined surface 96 is provided on the entire surface facing in the first direction X1 in the engaged portion 90. An angle of inclination of the inclined surface 96 is, for example, larger than that of the inclined surface 95. Here, the angles of inclination of the inclined surfaces 95, 96 to the third direction Z1 are acute angles in a plan view from the second direction Y1. The inclined surface 96 guides the engaging portion 140 to a position where the engaging portion 140 is engageable with the engaged portion 90 when the second connector 100 is assembled with the first connector 20.

Figure 15:
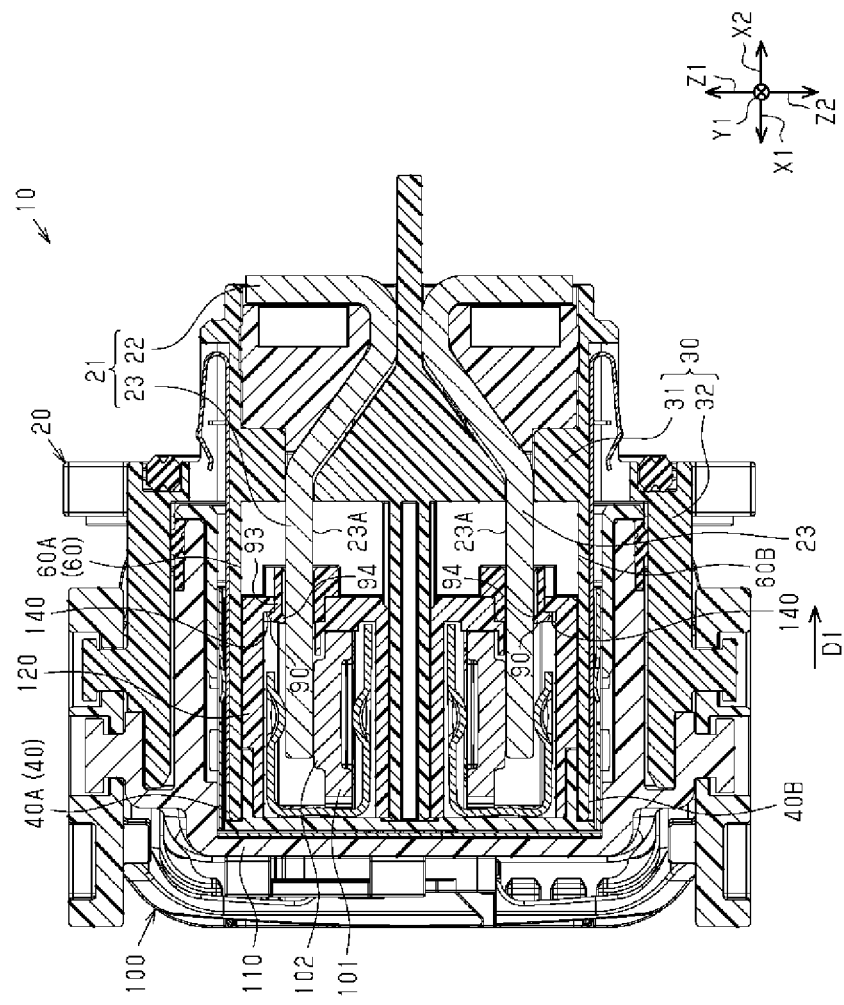
FIG. 15 is a schematic section showing the connector assembly of the embodiment.
Figure 16:
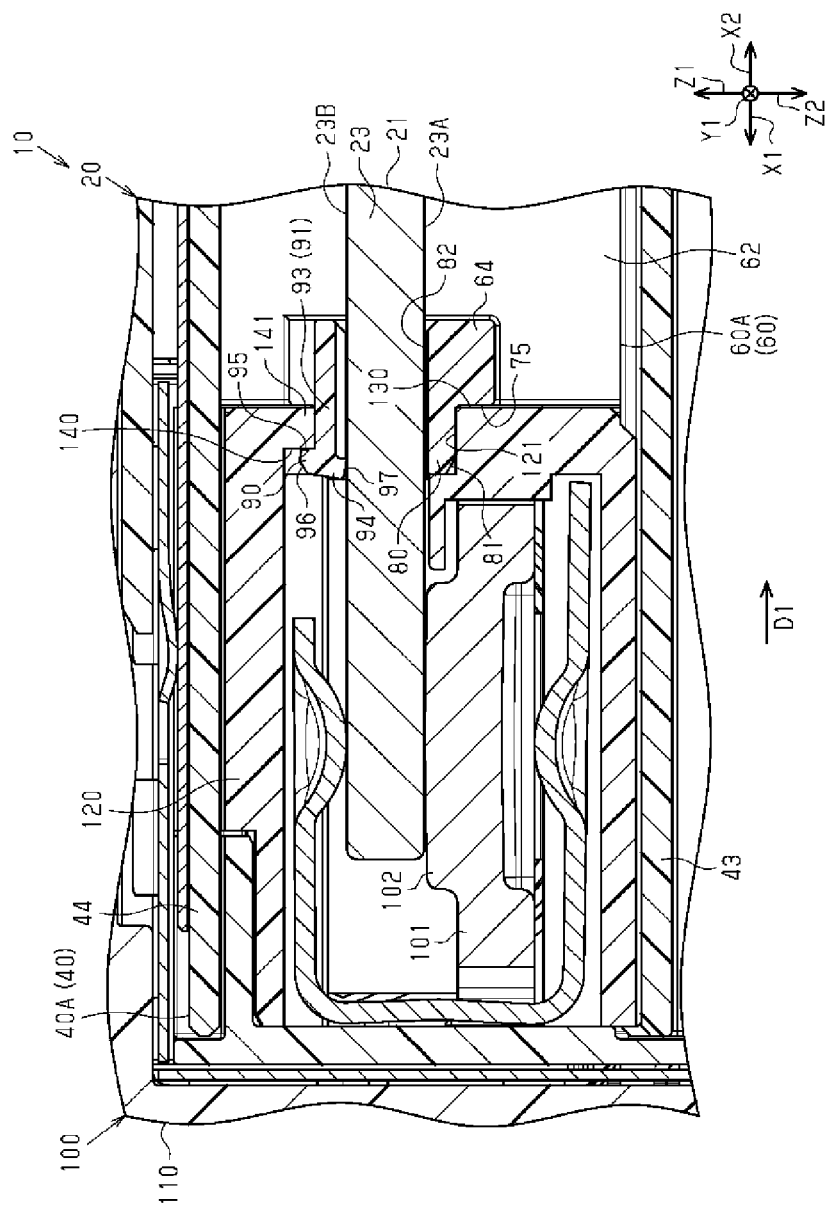
FIG. 16 is a schematic section enlargedly showing a part of the connector assembly of the embodiment.

As shown in FIGS. 15 and 16, the restricting protrusion 94 restricts a deflection amount of the flexible piece 93 so that the engaging portion 140 and the engaged portion 90 are not disengaged before the slide member 60A returns from the opening position to the closing position in detaching the second connector 100 from the first connector 20. The restricting protrusion 94 projects in the third opposite direction Z2. The restricting protrusion 94 projects further in the third opposite direction Z2 than the end surface facing in the third opposite direction Z2 in the flexible piece 93. As shown in FIG. 8, the restricting protrusion 94 projects slightly further in the third opposite direction Z2 than the inner peripheral surface of the peripheral wall on the third direction Z1 side in the tip protecting portion 80. The restricting protrusion 94 is, for example, formed to overlap a part of the connecting portion 23 in a plan view from the first direction X1. The restricting protrusion 94 is, for example, provided only in a part in the second direction Y1 of the flexible piece 93. The restricting protrusion 94 of this embodiment is provided only in an intermediate part in the second direction Y1 of the flexible piece 93. A length in the second direction Y1 of the restricting protrusion 94 is shorter than that of the engaged portion 90. A surface facing in the third opposite direction Z2 third direction Z1 in the restricting protrusion 94, i.e. a top surface 97 of the restricting protrusion 94, is formed on a plane orthogonal to the assembly direction D1.

As shown in FIG. 16, the restricting protrusion 94 is facing the non-connection surface 23B of the connecting portion 23 when the slide member 60A slides between the opening position and the closing position. The restricting protrusion 94 slides in the first direction X1 and the first opposite direction X2 while the top surface 97 is contacting the non-connection surface 23B when the tip protecting portion 80 slides between the protection position and the exposure position. At this time, the flexible piece 93 is deflected in the third direction Z1 by the contact of the top surface 97 with the non-connection surface 23B. The top surface 97 may be in surface contact, line contact or point contact with the non-connection surface 23B. Here, the non-connection surface 23B is formed on a plane extending in parallel to the first direction X1 in a movable range of the restricting protrusion 94 in the first direction X1 and the first opposite direction X2.

A projecting amount of the restricting protrusion 94 is, for example, so set that a clearance between the top surface 97 and the non-connection surface 23B when the top surface 97 is facing the non-connection surface 23B is smaller than an overlap amount of the engaging portion 140 and the engaged portion 90 in a plan view from the second direction Y1. The projecting amount of the restricting protrusion 94 is so set that the clearance between the top surface 97 and the non-connection surface 23B is smaller than the overlap amount of the engaging portion 140 and the engaged portion 90 with the slide member 60A located at the opening position. Here, the overlap amount of the engaging portion 140 and the engaged portion 90 is a distance along a deflection direction of the flexible piece 93, in particular the third direction Z1, in an overlapping region of the engaged portion 140 and the engaged portion 90 in the first direction X1. By setting the projecting amount of the restricting protrusion 94 in this way, the top surface 97 of the restricting protrusion 94 contacts the non-connection surface 23B before the engaging portion 140 and the engaged portion 90 are disengaged. Since the deflection of the flexible piece 93 in the third opposite direction Z2 is restricted in this way, the disengagement of the engaging portion 140 and the engaged portion 90 can be suppressed.

(Configuration of Slide Member 60B)

Next, a specific configuration of the slide member 60B is described with reference to FIGS. 11 and 12. Here, points of difference from the slide member 60A are mainly described, components similar to those of the slide member 60A are denoted by the same reference signs and the description thereof may be partly or entirely omitted. Further, the description is centered on the structure of the slide member 60B at the closing position.

Similarly to the slide member 60A, the slide member 60B includes a slide body portion 61, a tip protecting portion 80 and engaged portions 90.

(Configuration of Slide Body Portion 61)

The slide body portion 61 of the slide member 60B includes a base portion 62, a base portion 63 and a coupling portion 64. The base portions 62, 63 are structured similarly to the base portions 62, 63 of the slide member 60A.

The coupling portion 64 of the slide member 60B extends from the base portion 62 to the base portion 63 in the second opposite direction Y2. The coupling portion 64 is provided in intermediate parts in the width direction of the base portions 62, 63. The coupling portion 64 is provided slightly closer to guide portions 62A, 63A, i.e. the third opposite direction Z2 side than widthwise centers in the width directions of the base portions 62, 63. Thus, projecting amounts of the base portions 62, 63 in the third direction Z1 from a surface facing in the third direction Z1 in the coupling portion 64 are larger than those of the base portions 62, 63 in the third opposite direction Z2 from a surface facing in the third opposite direction Z2 in the coupling portion 64.

As shown in FIG. 8, in the slide member 60B, the tip surface of the base portion 62, that of the base portion 63 and that of the coupling portion 64 function as a pressed portion 75 to be pressed by a pressing portion 130 (see FIG. 17) provided in the second connector 100 when the first and second connectors 20, 100 are assembled. The slide member 60B slides to the closing position, for example, by the pressed portion 75 being pressed by the pressing portion 130. The planar shape of the pressed portion 75 of the slide member 60B when viewed from the first direction X1 is H-shaped, similarly to the pressed portion 75 of the slide member 60A.

(Configuration of Tip Protecting Portion 80)

As shown in FIG. 12, the tip protecting portion 80 of the slide member 60B is formed into a ring shape by including a through hole 80X, through which the connecting portion 23 is passed. A recess 82 is provided in the inner peripheral surface of the through hole 80X on the third direction Z1 side, i.e. the inner peripheral surface facing the connection surface 23A of the connecting portion 23, out of the inner peripheral surface of the through hole 80X. The bottom surface of the recess 82 is facing the connection surface 23A. The bottom surface of the recess 82 is provided apart from the connection surface 23A in the third direction Z1.

(Configuration of Engaged Portions 90)

As shown in FIGS. 11 and 12, the slide member 60B includes one or more (two in this embodiment) engaged pieces 91. The engaged portion 90 is provided on each of the two engaged pieces 91. Thus, the slide member 60B of this embodiment includes two engaged portions 90.

The engaged piece 91 of the slide member 60B is, for example, provided on the peripheral wall on the third opposite direction Z2 side in the tip protecting portion 80, i.e. the peripheral wall facing the non-connection surface 23B of the connecting portion 23, out of the peripheral wall of the tip protecting portion 80. Each engaged piece 91 is provided on a side opposite to the recess 82 across the first terminal 21 in the third direction Z1. Each engaged piece 91 is facing the recess 82.

Each engaged piece 91 of the slide member 60B includes, for example, a basis portion 92, a flexible piece 93, and the engaged portion 90 and a restricting protrusion 94 provided on a tip part of the flexible piece 93 similarly to each engaged piece 91 of the slide member 60A.

(Configuration of Second Connector 100)

Figure 17:
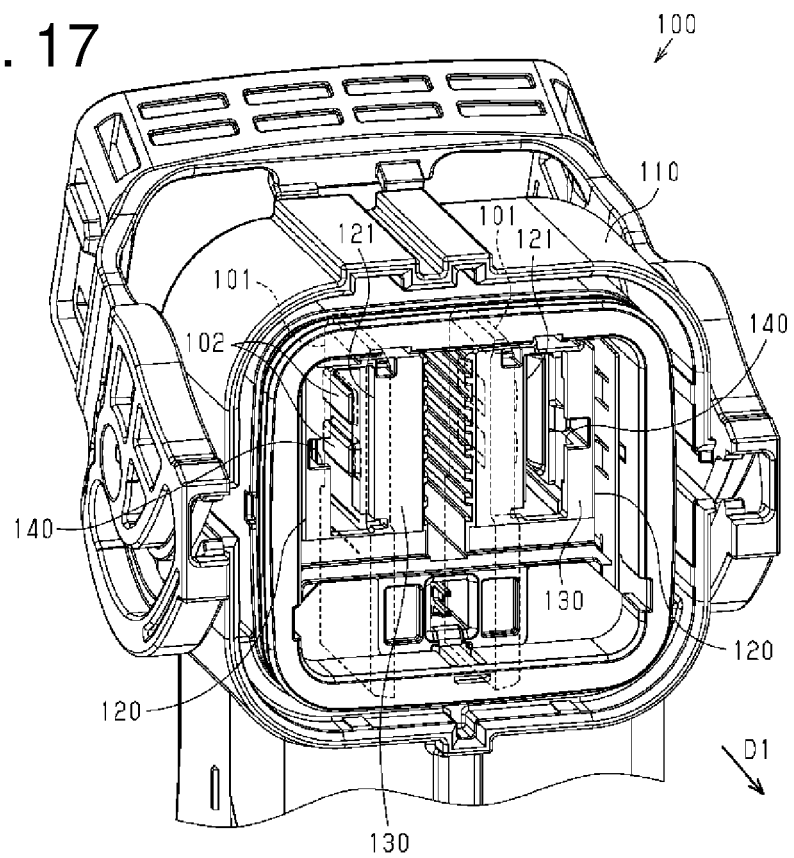
FIG. 17 is a schematic perspective view enlargedly showing a part of a second connector of the embodiment.
Figure 17:
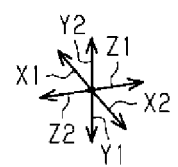

As shown in FIG. 17, the second connector 100 includes one or more (two in this embodiment) second terminals 101 made of metal and a second connector housing 110 for holding the second terminals 101. In this embodiment, the two second terminals 101 are held side by side along the third direction Z1 in the second connector housing 110. The second connector housing 110 is attachable to and detachable from the first connector housing 30. Note that the description of directions including the third direction Z1 in the second connector 100 are based on a state where the second connector 100 is assembled with the first connector 20.

A tip part of each second terminal 101 extends in the second opposite direction Y2. Each second terminal 101 is, for example, formed by press-working a metal plate material made of copper, copper alloy, aluminum, aluminum alloy or the like.

As shown in FIG. 15, the plurality of second terminals 101 are provided to respectively correspond to the plurality of first terminals 21. The tip part of each second terminal 101 includes a connecting portion 102 to be connected to the connection surface 23A of the first terminal 21. Each connecting portion 102 is in contact with and electrically connected to the connection surface 23A of the first terminal 21 with the first and second connectors 20, 100 assembled.

As shown in FIG. 17, the second connector housing 110 includes one or more (two in this embodiment) terminal accommodating portions 120 for accommodating the second terminals 101, the pressing portions 130 and the engaging portions 140. The plurality of terminal accommodating portions 120 are provided to respectively correspond to the plurality of second terminals 101. Each terminal accommodating portion 120 includes an insertion hole 121, into which the first terminal 21 (see FIG. 16) is inserted. The insertion hole 121 is open in a direction parallel to the assembly direction D1, in particular in the first opposite direction X2. Each terminal accommodating portion 120 holds the second terminal 101 with the connecting portion 102 of the second terminal 102 exposed in an internal space of the terminal accommodating portion 120.

The pressing portions 130 are respectively provided in the plurality of terminal accommodating portions 120. Thus, the second connector housing 110 of this embodiment includes two pressing portions 130.

Figure 18:
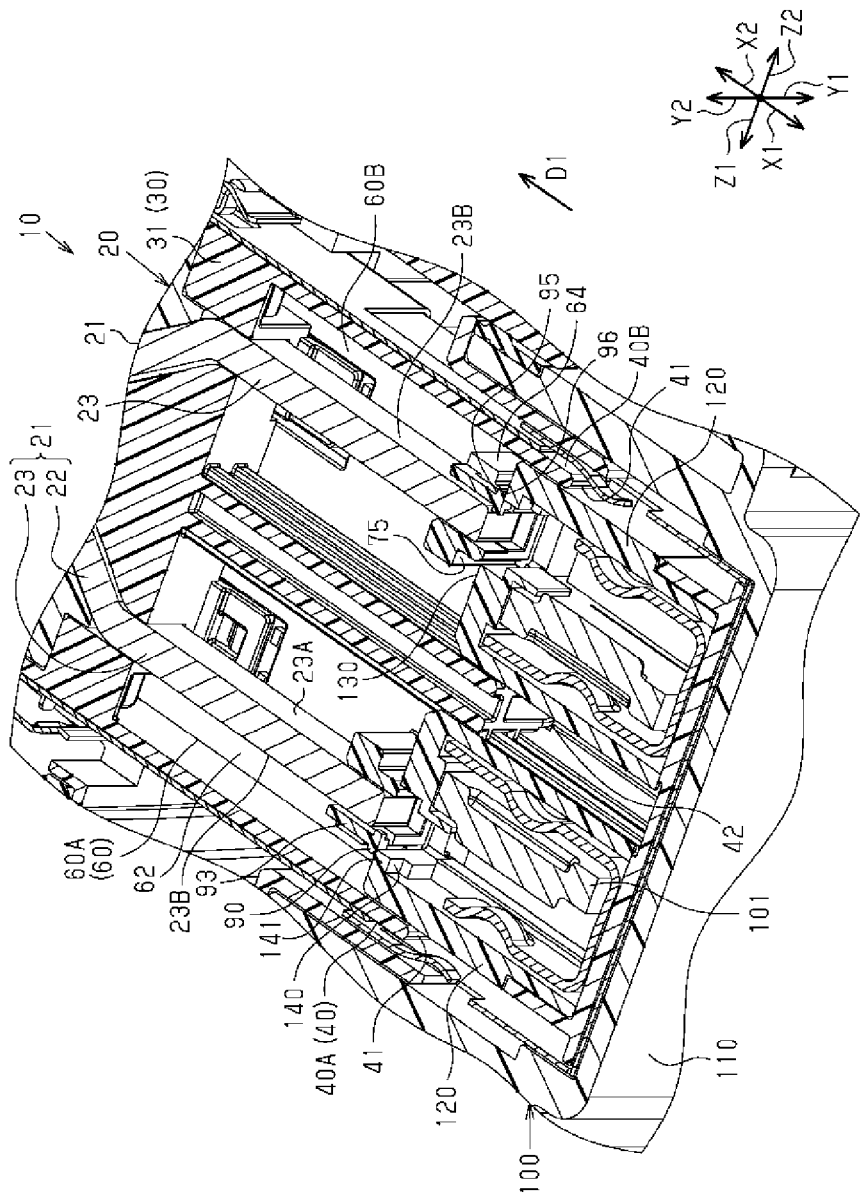
FIG. 18 is a schematic perspective view partly in section showing the connector assembly of the embodiment.

As shown in FIG. 18, the respective pressing portions 130 are provided at positions corresponding to the pressed portions 75 of the respective slide members 60A, 60B in the second connector housing 110. Each pressing portion 130 is, for example, constituted by a surface facing in the first opposite direction X2 in each terminal accommodating portion 120. Each pressing portion 130 is, for example, constituted by a surface facing the first connector 20, out of each terminal accommodating portion 120. As shown in FIG. 14, each pressing portion 130 is in line or surface contact with the pressed portion 75. That is, each pressing portion 130 is in contact with the pressed portion 75 at multiple points. The respective pressing portions 130 of this embodiment press the pressed portions 75 while being held in surface contact with the pressed portions 75 to slide the respective slide members 60A, 60B to the opening position when the second connector 100 is assembled with the first connector 20.

As shown in FIG. 18, the engaging portions 140 are respectively provided in the plurality of terminal accommodating portions 120. Two engaging portions 140 are provided to respectively correspond to the two engaged portions 90 in each terminal accommodating portion 120. Thus, the second connector housing 110 of this embodiment includes four engaging portions 140. The respective engaging portions 140 are provided at positions corresponding to the engaged portions 90 of the respective slide members 60A, 60B in the second connector housing 110. The respective engaging portions 140 pull the engaged portions 90 to slide the respective slide members 60A, 60B to the closing position when the second connector 100 is detached from the first connector 20.

As shown in FIG. 14, each engaging portion 140 includes a claw 141 projecting toward a center axis of the insertion hole 121 from the same plane as the pressing portion 130. The claw 141 projects, for example, in a direction approaching the side wall 43 from the pressing portion 130 provided near the side wall 44, out of the side walls 43, 44 of the protecting portion 40, in particular in the third direction Z1 or third opposite direction Z2. The claw 141 projects, for example, inwardly of the insertion hole 121. The engaging portion 140 is constituted by a surface facing in the first direction X1 in the claw 141. The surface facing in the first direction X1 and a surface facing in the first opposite direction X2 in the claw 141 are, for example, formed on planes orthogonal to the first direction X1. The respective engaging portions 140 pull the engaged portions 90 with the surfaces facing in the first direction X1 in the claws 141 engaged with the inclined surfaces 95 of the engaged portions 90, thereby sliding the respective slide members 60A, 60B to the closing position, when the second connector 100 is detached from the first connector 20.

Next, functions of the connector assembly 10 are described.

As shown in FIG. 3, the slide members 60 are arranged at the closing position for closing the second openings 42 in a state before the second connector 100 (see FIG. 1) is assembled with the first connector 20. This suppresses, for example, the touch of worker's fingers with the first terminals 21 through the second openings 42. Further, with the slide members 60 arranged at the closing position, the tip protecting portions 80 of the slide members 60 are arranged at the protection position for surrounding the tip parts of the first terminals 21. Thus, the touch of the worker's fingers with the first terminals 21 is suppressed by the tip protecting portions 80, for example, even if the worker's fingers enter the protecting portions 40 through the first openings 41.

Next, the attachment and detachment of the first and second connectors 20, 100 are described with reference to FIGS. 16, 18, 19 and 20.

Figure 19:
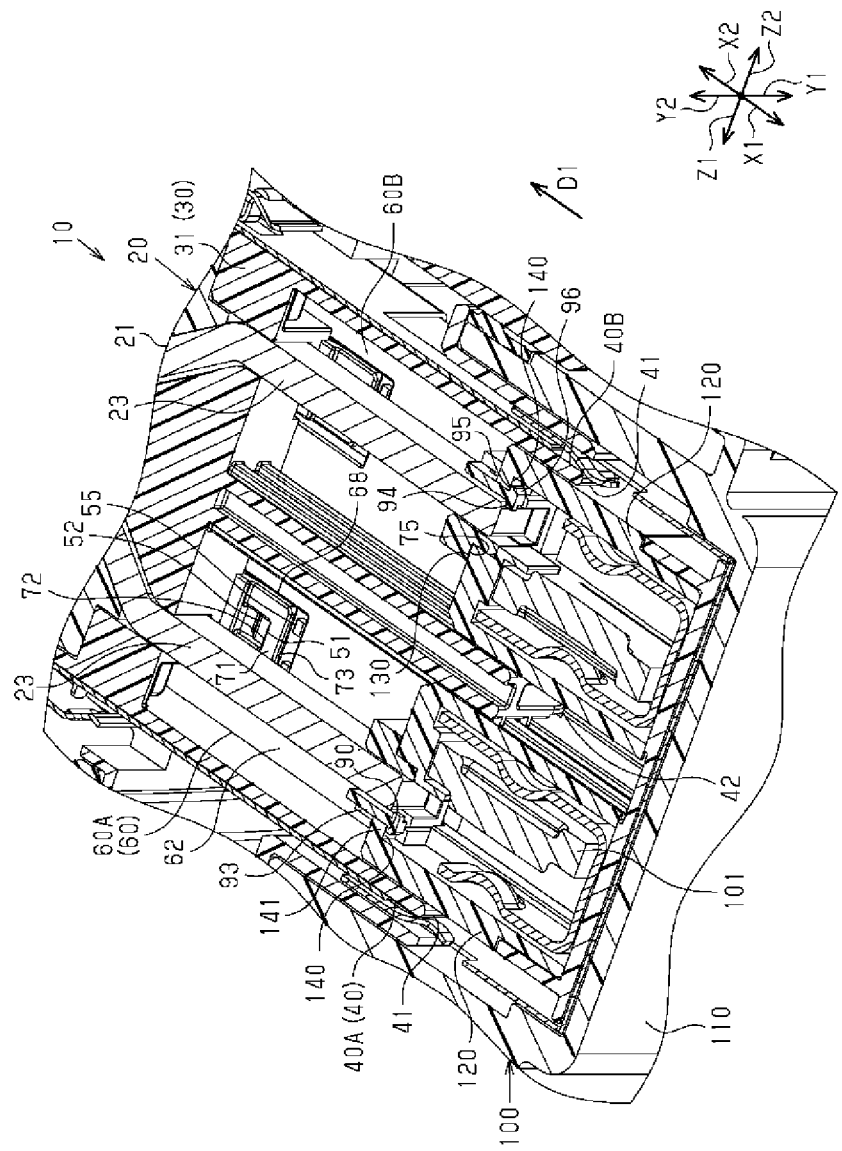
FIG. 19 is a schematic perspective view partly in section showing the connector assembly of the embodiment.

As shown in FIG. 18, in assembling the second connector 100 with the first connector 20 along the assembly direction D1, the surfaces facing in the first opposite direction X2 in the claws 141 first contact the tip surfaces of the flexible pieces 93. At this time, the flexible pieces 93 are deflected toward the first terminals 21 by the action of the surfaces facing in the first opposite direction X2 in the claws 141 and the inclined surfaces 96 of the engaged portions 90, whereby the claws 141 ride over the engaged portions 90. In this way, as shown in FIG. 19, the engaging portions 140 are arranged at the positions where the engaging portions 140 are engageable with the engaged portions 90, in particular at positions where the surfaces facing in the first opposite direction X2 in the claws 141 are engageable with the inclined surfaces 95 of the engaged portions 90. That is, the claws 141 of the engaging portions 140 are guided to the positions where the claws 141 are engageable with the inclined surfaces 95 of the engaged portions 90 by the inclined surfaces 96 of the engaged portions 90. Here, since the tip parts of the flexible pieces 93 project further in the first direction X1 than the tip surfaces of the first terminals 21 with the slide members 60 located at the closing position, it is suppressed that the restricting protrusions 94 contact the first terminals 21 when the flexible pieces 93 are deflected toward the first terminals 21. Further, when the flexible pieces 93 are deflected toward the first terminals 21, the slide members 60 are kept at the closing position by the engagement of the slide-side suppressing portions 72 and the connector-side suppressing portions 51.

Then, as the connection of the first and second connectors 20, 100 proceeds, the pressing portions 130 press the pressed portions 75 in the first opposite direction X2 while being held in surface contact with the pressed portions 75. At this time, forces of the set value or greater are applied in the first opposite direction X2 to the slide members 60 at the closing position. Thus, the engaging pieces 68 of the slide members 60 are deflected, the coupling pieces 71 ride over the suppressing protrusions 52, the slide-side suppressing portions 72 are disengaged from the connector-side suppressing portions 51 and the slide members 60 move in the first opposite direction X2.

Figure 20:
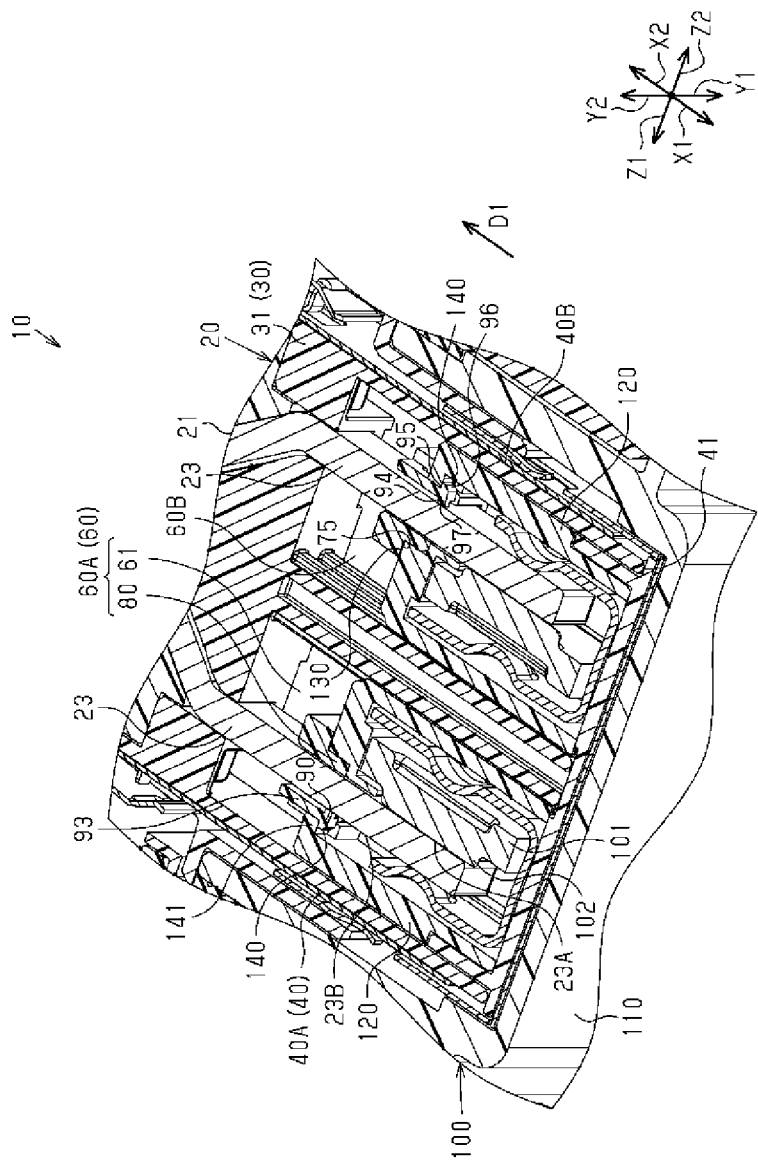
FIG. 20 is a schematic perspective view partly in section showing the connector assembly of the embodiment.

Substantially, as shown in FIGS. 16 and 20, the pressed portions 75 are pressed by the pressing portions 130, whereby the slide members 60 slide to the opening position. At this time, the tip protecting portions 80 are also moved in the first opposite direction X2 together with the slide body portions 61. In this way, the tip parts of the first terminals 21 are exposed from the tip protecting portions 80. Here, since the recesses 82 are provided in the inner peripheral surfaces of the peripheral walls facing the connection surfaces 23A of the first terminals 21, out of the peripheral walls of the tip protecting portions 80, the wear of the connection surfaces 23A due to contact with the inner peripheral surfaces of the tip protecting portions 80 can be suppressed when the slide members 60 slide. Then, in a state where the assembling of the first and second connectors 20, 100 is completed, the connection surfaces 23A of the first terminals 21 and the connecting portions 102 of the second terminals 101 are in contact with each other and the first and second terminals 21, 101 are electrically connected. Further, in the state where the assembling of the first and second connectors 20, 100 is completed, the slide members 60 are arranged at the opening position. Here, with the slide members 60 located at the opening position, the tip protecting portions 80 are provided on the side further in the first opposite direction X2 than connected parts of the first and second terminals 21, 101. Further, at the opening position, the entire slide members 60 are provided on the side further in the first opposite direction X2 than the connected parts of the first and second terminals 21, 102. Thus, in the state where the assembling of the first and second connectors 20, 100 is completed, the slide members 60 are not located near the connected parts of the first and second terminals 21, 101 in the internal spaces of the terminal accommodating portions 120. Therefore, even if the slide member 60 is broken due to durability deterioration or the like, it can be suppressed that the broken slide member 60 adversely affects the electrical connection of the first and second terminals 21, 101.

Substantially, in detaching the second connector 100 from the first connector 20, the engaged portions 90 are pulled in the first direction X1 by the engaging portions 140 by the engagement of the claws 141 of the engaging portions 140 with the inclined surfaces 95 of the engaged portions 90. In this way, the slide members 60 are slid from the opening position to the closing position. At this time, the flexible pieces 93 are deflected toward the first terminals 21 by the engagement of the inclined surfaces 95 and the claws 141. However, the restricting protrusions 94 projecting toward the first terminals 21 are provided on the tip parts of the flexible pieces 93. Further, the clearances between the top surfaces 97 of the restricting protrusions 94 and the non-connection surfaces 23B of the first terminals 21 are set to be smaller than the overlap amounts of the claws 141 and the engaged portions 90. Thus, even if the flexible pieces 93 are deflected toward the first terminals 21, the top surfaces 97 of the restricting protrusions 94 can be brought into contact with the non-connection surfaces 23B to restrict the deflection amounts of the flexible pieces 93 before the claws 141 and the engaged portions 90 are disengaged. As a result, the disengagement of the engaging portions 140 and the engaged portions 90 can be suppressed during sliding movements of the slide members 60 from the opening position to the closing position. In other words, the engaging portions 140 are engaged with the engaged portions 90 and pull the engaged portions 90, whereby the slide members 60 can be suitably slid to the closing position.

If the slide members 60 slide to the closing position as shown in FIG. 19, the slide-side suppressing portions 72 and the connector-side suppressing portions 51 are engaged with each other and the slide-side restricting portions 73 and the connector-side restricting portions 55 are engaged with each other. In this way, movements of the slide members 60 in the first direction X1 are restricted. Subsequently, if the second connector 100 is further detached from the first connector 20, the flexible pieces 93 are deflected toward the first terminals 21 by the action of the surfaces facing in the first direction X1 in the claws 141 and the inclined surfaces 95 of the engaged portions 90, whereby the claws 141 are detached from the engaged portions 90. In this way, as shown in FIG. 18, the engaging portions 140 and the engaged portions 90 are disengaged and the second connector 100 is removed from the first connector 20. That is, the claws 141 of the engaging portions 140 are guided by the inclined surfaces 95 of the engaged portions 90 to positions where the claws 141 are disengaged from the inclined surfaces 95 of the engaged portions 90. With the second connector 100 detached from the first connector 20, the slide members 60 are back at the closing position for closing the second openings 42. In this way, it is suppressed that the worker's fingers touch the first terminals 21, for example, through the second openings 42.

Next, effects of this embodiment are described.

(1) The slide members 60 are provided which are slidable between the closing position for closing the second openings 42 open in the second direction Y1 and the opening position. In the slide member 60, the slide body portion 61 for closing the second opening 42 at the closing position and the tip protecting portion 80 for protecting the tip part of the first terminal 21 at the closing position are integrally formed. In this way, with the slide members 60A, 60B located at the closing position, the second openings 42 are closed by the slide body portions 61, wherefore it can be suppressed that the worker's fingers touch the first terminals 21, for example, through the second openings 42. Further, with the slide members 60 located at the closing position, the tip parts of the first terminals 21 are protected by the tip protecting portions 80. Thus, for example, even if the worker's finger enters the protecting portion 40 through the first opening 41, the touch of the worker's finger with the first terminal 21 can be suppressed by the tip protecting portion 80. Further, since the slide body portion 61 and the tip protecting portion 80 are integrally formed, the number of components can be reduced as compared to the case where the slide body portion 61 and the tip protecting portion 80 are separate components. By these, the number of components can be reduced while an electric shock prevention measure is taken.

(2) The tip protecting portion 80 slides in the first opposite direction X2 together with the slide body portion 61 when the slide member 60 slides from the closing position to the opening position. The tip protecting portion 80 is provided on the side further in the first opposite direction X2 than the connected part of the first terminal 21 and the second terminal 101 at the opening position. Thus, with the assembling of the first and second connectors 20, 100 completed, the slide members 60 are not near the connected parts of the first and second terminals 21, 101 in the internal spaces of the terminal accommodating portions 120. Therefore, even if the tip protecting portion 80 is broken due to durability deterioration or the like, it can be suppressed that the broken tip protecting portion 80 adversely affects the electrical connection of the first and second terminals 21, 101. That is, a reduction in the electrical connection reliability of the first and second terminals 21, 101 can be suppressed.

(3) The protecting portion 40 includes the pair of guide grooves 48A, 48B, and the slide member 60 includes the pair of guide portions 62A, 62B to be fit into the pair of guide grooves 48A, 48B. According to this configuration, the guide portions 62A, 62B are guided by the guide grooves 48A, 48B, whereby the slide member 60 can smoothly slide in the first direction X1 and the first opposite direction X2. Further, when the slide member 60 slides, the inclination of the slide member 60 can be suppressed.

(4) The protecting portion 40 includes the pair of guide grooves 50A, 50B provided apart from the guide grooves 48A, 48B in the second direction Y1, and the slide member 60 includes the pair of guide portions 63A, 63B to be fit into the pair of guide grooves 50A, 50B. According to this configuration, the guide portions 63A, 63B are guided by the guide grooves 50A, 50B, whereby the slide member 60 can smoothly slide in the first direction X1 and the first opposite direction X2. Further, since the guide portions 62A, 62B and the guide portions 63A, 63B are respectively guided by the guide grooves 48A, 48B and the guide grooves 50A, 50B separated from each other in the second directions Y1 when the slide member 60 slides, the inclination of the slide member 60 can be suitably suppressed.

(5) Only one 62A of the pair of guide portions 62A, 62B is provided with the groove portion 65. Further, only the guide portion 62A including the groove portion 65 is fittable into one 48A of the pair of guide grooves 48A, 48B, and the guide portion 62B not including the groove portion 65 is not fittable. Thus, the slide member 60 can be assembled with the first connector housing 30 only in such a posture that the guide portion 62A including the groove portion 65 is fit into the one guide groove 48A. Therefore, erroneous assembling of the slide member 60 can be suppressed.

(6) When the second connector 100 is assembled with the first connector 20, the pressed portions 75 are pressed by the pressing portions 130 of the second connector 100, whereby the slide members 60 slide to the opening position. Thus, it is not necessary to slide the slide members 60 to the opening position, for example, by a jig or the like. That is, the worker can slide the slide members 60 to the opening position without requiring another step only by assembling the second connector 100 with the first connector 20.

(7) Since the pressed portions 75 are brought into surface contact with the pressing portions 130, the slide members 60 can be smoothly and stably slid to the opening position as compared to the case where the pressed portions 75 are brought into point contact with the pressing portions 130.

(8) When the second connector 100 is detached from the first connector 20, the engaged portions 90 are pulled by the engaging portions 140 of the second connector 100, whereby the slide members 60 slide to the closing position. Thus, it is not necessary to slide the slide members 60 to the closing position, for example, by a jig or the like. That is, the worker can slide the slide members 60 to the closing position without requiring another step only by detaching the second connector 100 from the first connector 20. Further, if the slide members 60 are biased in the first direction X1, for example, by biasing members such as springs, the slide members 60 can be slid to the closing position without requiring another step. However, the above configuration does not require the biasing members unlike this configuration.

(9) The engaged portions 90 are provided on the tip parts of the flexible pieces 93 flexible in the direction (here, third direction Z1) orthogonal to the first direction X1. Further, with the slide members 60 located at the closing position, the engaged portions 90 are provided at the positions projecting further in the first direction X1 than the tip parts of the first terminals 21. Thus, when the flexible piece 93 is deflected in the third direction Z1 orthogonal to the first direction X1, the contact of the engaged portion 90 with the first terminal 21 can be suppressed and the flexible piece 93 can be suitably deflected. By the deflection of the flexible piece 93, the engaged portion 90 provided on the tip part of the flexible piece 93 and the engaging portion 140 of the second connector 100 can be easily engaged. That is, when the second connector 100 is assembled with the first connector 20, the engaging portions 140 and the engaged portions 90 can be easily engaged by the deflection of the flexible pieces 93. Further, when the second connector 100 is detached from the first connector 20, the engaging portions 140 and the engaged portions 90 can be easily disengaged by the deflection of the flexible pieces 93.

(10) With the slide members 60 located at the closing position, the tip parts of the ring-shaped tip protecting portions 80 surrounding the outer peripheries of the first terminals 21 are formed to project further in the first direction X1 than the tip parts of the first terminals 21. Thus, even if the worker's finger enters the protecting portion 40, for example, through the first opening 41, the touch of the worker's finger with the first terminal 21 can be suitably suppressed by the tip protecting portion 80. Further, the engaged portions 90 constitute parts of the tip protecting portion 80. Thus, the engaged portions 90 have a function of engagement with the engaging portions 140 of the second connector 100 and also a function of suppressing the touch of the worker's finger with the first terminal 21.

(11) The surface facing in the first direction X1 in the engaged portion 90 does not project further in the first direction X11 than the surface facing in the first direction X1 in the tip protecting portion 80. Thus, when the second connector 100 is assembled with the first connector 20, it can be suppressed that a stress generated by contact with the second connector 100 concentrates on the engaged portion 90. In this way, the breakage of the engaged portion 90 can be suppressed.

(12) The recess 82 facing the connection surface 23A of the first terminal 21 is provided in the inner peripheral surface of the tip protecting portion 90. By providing this recess 82, the contact of the inner peripheral surface of the tip protecting portion 80 and the connection surface 23A of the first terminal 21 can be suppressed when the slide member 60 slides. Thus, it can be suppressed that the connection surface 23A of the first terminal 21 is worn due to contact with the inner peripheral surface of the tip protecting portion 80. As a result, it can be suppressed that a contact area of the first and second terminals 21, 101 is reduced, for example, due to the wear of the connection surface 23A of the first terminal 21. Therefore, an increase in contact resistance in the connected part of the first and second terminals 21, 101 can be suitably suppressed. Consequently, heat generation in the connected part of the first and second terminals 21, 10 can be suppressed.

(13) The engaged portion 90 is provided on the side opposite to the recess 82 across the first terminal 21 in the third direction Z1. Since the engaged portion 90 is provided on the side of the non-connection surface 23B of the first terminal 21 in this way, the engaged portion 90 does not face the connection surface 23A of the first terminal 21. Thus, the contact of the engaged portions 90 with the connection surface 23A of the first terminal 21 can be prevented when the slide member 60 slides. Therefore, it can be suppressed that the connection surface 23A of the first terminal 21 is worn due to contact with the engaged portions 90. As a result, an increase in contact resistance in the connected part of the first and second terminals 21, 101 can be suitably suppressed and heat generation in the connected part of the first and second terminals 21, 101 can be suppressed.

(14) The slide member 60 includes the inclined surfaces 95 for guiding the engaging portions 140 such that the engaging portions 140 are disengaged from the engaged portions 90 with the slide member 60 located at the closing position. Thus, when the second connector 100 is detached from the first connector 20, the engaging portions 140 and the engaged portions 90 can be easily disengaged. In this way, the second connector 100 can be easily and properly detached from the first connector 20.

(15) The slide member 60 includes the inclined surfaces 96 for guiding the engaging portions 140 such that the engaging portions 140 are engageable with the engaged portions 90 when the second connector 100 is assembled with the first connector 20. Thus, when the second connector 100 is assembled with the first connector 20, the engaging portions 140 and the engaged portions 90 can be easily engaged. In this way, the second connector 100 can be easily and properly assembled with the first connector 20.

(16) The tip protecting portions 80 include the inclined surfaces 81 for guiding the second connector 100 into the first connector housing 30 when the second connector 100 is assembled with the first connector 20. Thus, the second connector 100 can be easily connected to the first connector 20 when being assembled with the first connector 20.

(17) Since the slide member 60 includes the plurality of engaged portions 90, the slide member 60 can be smoothly and stably slid to the closing position as compared to a configuration including a single engaged portion 90. Further, for example, even if one engaged portion 90 and one engaging portion 140 are accidentally disengaged, the remaining engaged portion 90 is pulled by the engaging portion 140, whereby the slide member 60 can be slid to the closing position.

(18) The retaining protrusion 94 projecting toward the first terminal 21 in the deflection direction of the flexible piece 93 is provided on the tip part of the flexible piece 93. Thus, with the slide member 60 located at the opening position, the retaining protrusion 94 faces the first terminal 21. Accordingly, even if the flexible piece 93 is going to be largely deflected toward the first terminal 21 when the second connector 100 is detached from the first connector 20, the retaining protrusion 94 contacts the first terminal 21, thereby suppressing large deflection of the flexible piece 93. In this way, it can be suitably suppressed that the engaging portion 140 and the engaged portion 90 are disengaged, for example, due to large deflection of the flexible piece 93. That is, when the second connector 100 is detached from the first connector 20, the disengagement of the engaging portions 140 and the engaged portions 90 can be suitably suppressed during a sliding movement of the slide member 60 from the opening position to the closing position. Thus, when the second connector 100 is detached from the first connector 20, the slide member 60 can be suitably returned to the closing position by the engaged portions 90 being pulled by the engaging portions 140.

(19) The projecting amount of the retaining protrusion 94 is so set that the clearance between the top surface 97 of the retaining protrusion 94 and the first terminal 21 is smaller than the overlap amount of the engaged portion 90 and the engaging portion 140 with the slide member 60 located at the opening position. Here, the overlap amount of the engaging portion 140 and the engaged portion 90 is a distance along the deflection direction of the flexible piece 93 in the overlapping region of the engaged portion 90 and the engaged portion 140 in the first direction X1. By setting the projecting amount of the restricting protrusion 94 in this way, the top surface 97 of the restricting protrusion 94 can contact the first terminal 21 before the engaged portion 90 and the engaging portion 140 are disengaged, for example, even if the flexible piece 93 is deflected toward the first terminal 21 when the second connector 100 is detached from the first connector 20. Since any further deflection of the flexible piece 93 can be restricted in this way, the disengagement of the engaged portion 90 and the engaged portion 140 can be suitably suppressed.

(20) The top surface 97 of the retaining protrusion 94 is formed into a flat surface parallel to the first direction X1 and the first terminal 21 is formed into a flat plate in the movable range of the retaining protrusion 94. Thus, the flat top surface 97 of the retaining protrusion 94 and the flat surface of the first terminal 21 can be brought into contact. Since the top surface 97 of the retaining protrusion 94 and the first terminal 21 can be suitably brought into contact in this way, for example, when the second connector 100 is detached from the first connector 20, the deflection of the flexible piece 93 can be suitably restricted. Therefore, the disengagement of the engaged portion 90 and the engaged portion 140 can be suitably suppressed.

(21) The second connector 100 includes the pressing portions 130 for sliding the slide members 60 to the opening position by pressing the pressed portions 75 provided in the slide members 60 when the second connector 100 is assembled with the first connector 20. Thus, it is not necessary to slide the slide members 60 to the opening position, for example, by a jig or the like. That is, the worker can slide the slide members 60 to the opening position without requiring another step only by assembling the second connector 100 with the first connector 20.

(22) The second connector 100 includes the engaging portions 140 for moving the slide members 60 to the closing position by pulling the engaged portions 90 provided in the slide members 60 when the second connector 100 is detached from the first connector 20. Thus, it is not necessary to slide the slide members 60 to the closing position, for example, by a jig or the like. That is, the worker can slide the slide members 60 to the closing position without requiring another step only by detaching the second connector 100 from the first connector 20.

Other Embodiments

This embodiment can be modified and carried out as follows. This embodiment and the following modifications can be carried out in combination without technically contradicting each other.

Although the slide member 60 of the above embodiment includes the retaining protrusion 94 provided on the tip part of the flexible piece 93, the configuration of the retaining protrusion 94 may be changed as appropriate. For example, the retaining protrusion 94 may be provided in an intermediate part in a length direction of the flexible piece 93. Further, the top surface 97 of the retaining protrusion 94 may be formed into a curved surface. Alternatively, the retaining protrusion 94 may be omitted.

Although the outer peripheral surface of the tip protecting portion 80 of the above embodiment has the inclined surface 81, there is no limitation to this and the inclined surface 81 may not be provided.

Although the inner peripheral surface of the tip protecting portion 80 of the above embodiment includes the recess 82, there is no limitation to this and the recess 82 may not be provided.

Although the slide member 60 of the above embodiment includes the engaged portion 90 to be pulled by the engaging portion 140 of the second connector 100 when the second connector 100 is detached from the first connector 20, the configuration of the engaged portion 90 may be changed as appropriate. For example, although the engaged portion 90 has the inclined surface 95, there is no limitation to this and the inclined surface 95 may not be provided. For example, although the engaged portion 90 has the inclined surface 96, there is no limitation to this and the inclined surface 96 may not be provided.

Although the engaged portion 90 is provided on the tip part of the flexible piece 93 in the above embodiment, there is no limitation to this and the engaged portion 90 may be provided on a non-flexible part. Note that, in this case, the engaging portion 140 is preferably provided on a flexible part.

Although the engaged portion 90 is provided on the side opposite to the recess 82 across the first terminal 21 in the third direction Z1 in the above embodiment, there is no limitation to this. For example, the engaged portion 90 may be provided on the peripheral wall on the second direction Y1 side or the second opposite direction Y2 side in the tip protecting portion 80.

Although the engaged portion 90 is provided in the tip protecting portion 80 in the above embodiment, there is no limitation to this. For example, the engaged portion 90 may be provided in the base portion 62 or 63.

The number of the engaged portions 90 of the above embodiment may be changed to one, three or more. Further, the engaged portions 90 may be omitted.

Although the slide member 60 of the above embodiment includes the pressed portion 75 to be pressed by the pressing portion 130 of the second connector 100 when the second connector 100 is assembled with the first connector 20, the configuration of the pressed portion 75 may be changed as appropriate. For example, although the planar shape of the pressed portion 75 when viewed from the first direction X is H-shaped, there is no limitation to this. The planar shape of the pressed portion 75 can be an arbitrary shape. Further, the pressed portion 75 may be divided into two or more sections.

Although the planar shape of the slide member 60 of the above embodiment when viewed from the first direction X1 is formed point-asymmetrically with respect to the center axis of the slide member 60 extending in parallel to the first direction X1, there is no limitation to this. For example, the planar shape of the slide member 60 when viewed from the first direction X1 may be formed point-symmetrically with respect to the center axis of the slide member 60 extending in parallel to the first direction X1.

Although the groove portion 65 is provided only in one guide portion 62A, out of the pair of guide portions 62A, 62B, in the slide member 60 of the above embodiment, there is no limitation to this. For example, the groove portion 65 may be provided also in the guide portion 62B. Further, neither of the guide portions 62A, 62B may include the groove portion 65.

Although the slide member 60 of the above embodiment includes the pair of guide portions 62A, 62B and the pair of guide portions 63A, 63B, there is no limitation to this. For example, the slide member 60 may be configured not to include the pair of guide portions 63A, 63B.

Although the two slide members 60A, 60B to be individually mounted into the two protecting portions 40A, 40B are provided in the first connector 20 of the above embodiment, there is no limitation to this. For example, one slide member 60 may be mounted for the two protecting portions 40A, 40B. The slide member 60 in this case includes a slide body portion 61 for closing the second opening 42 of the protecting portion 40A and the second opening 42 of the protecting portion 40B at the closing position and two tip protecting portions 80 for respectively protecting the tip parts of the two first terminals 21.

Although the side wall 43 of the protecting portion 40A and the side wall 43 of the protecting portion 40B are integrally formed via the coupling portion 47 in the protecting portions 40 of the above embodiment, there is no limitation to this. For example, the coupling portion 47 may be omitted from the protecting portions 40 and the side wall 43 of the protecting portion 40A and the side wall 43 of the protecting portion 40B may not be integrally formed.

Although the first connector housing 30 of the above embodiment includes the connector-side suppressing portion 51 for suppressing a movement of the slide member 60 at the closing position in the first opposite direction X2, the configuration of the connector-side suppressing portion 51 may be changed as appropriate.

Although the first connector housing 30 of the above embodiment includes the connector-side restricting portion 55 for restricting a movement of the slide member 60 at the closing position in the first direction X1, the configuration of the connector-side restricting portion 55 may be changed as appropriate.

Although the second connector 100 of the above embodiment includes the pressing portion 130 for pressing the pressed portion 75 provided in the slide member 60 when the second connector 100 is assembled with the first connector 20, the configuration of the pressing portion 130 may be changed as appropriate. For example, the pressing portion 130 may be provided on the second terminal 101.

Although the second connector 100 of the above embodiment includes the engaging portion 140 for pulling the guide portion 90 provided in the slide member 60 when the second connector 100 is detached from the first connector 20, the configuration of the engaging portion 140 may be changed as appropriate. For example, the engaging portion 140 may be provided on the second terminal 101.

Although the first connector 20 of the above embodiment is configured to include two first terminals 21, one, three or more first terminals 21 may be provided.

Although the second connector 100 of the above embodiment is configured to include two second terminals 101, one, three or more second terminals 101 may be provided.

As shown in FIGS. 3 and 9, the protecting portion 40 may extend from the basis portion 31 in the first direction X1 to project further in the first direction X1 than the tip part of the connecting portion 23 of the first terminal 21 except the part where the second opening 42 is provided. That is, the pair of side walls 43, 44 and the upper wall 46 may extend from the basis portion 31 in the first direction X1 to project further in the first direction X1 than the tip part of the connecting portion 23 of the first terminal 21.

As shown in FIG. 9, the length in the first direction X1 of the base portion 62 of the slide member 60 may be longer than that of the part exposed via the second opening 42 in the connecting portion 23 of the first terminal 21. As shown in FIG. 8, the length along the third direction Z1 of the base portion 62 may be longer than that of the connecting portion 23. In this way, the base portion 62 of the slide member 60 may cover the entire part exposed via the second opening 42 in the connecting portion 23 of the first terminal 21 when viewed from the second direction Y1.

As shown in FIGS. 9 and 11, the sum of the lengths along the first direction X1 of the coupling portion 64 and the tip protecting portion 80 may be shorter than the length along the first direction X1 of the connecting portion 23 of the first terminal 21, specifically the length along the first direction X1 of the part exposed via the second opening 42 in the connecting portion 23. The slide member 60 may be substantially L-shaped when viewed from the third direction Z1.

The embodiments disclosed this time should be considered illustrative in all aspects, rather than restrictive. The scope of the present invention is represented not by the above meaning, but by claims and is intended to include all changes in the scope of claims and in the meaning and scope of equivalents.

LIST OF REFERENCE NUMERALS 10 connector assembly
20 first connector
21 first terminal
22 basis portion
23 connecting portion
23A connection surface
23B non-connection surface
30 first connector housing
31 basis portion
31A fixing portion
31X insertion hole
32 peripheral wall portion
40, 40A, 40B protecting portion
41 first opening
42 second opening
43, 44 side wall
45 lower wall
46 upper wall
47 coupling wall
48A, 48B guide groove (first guide groove)
49 protrusion
50A, 50B guide groove (second guide groove)
51 connector-side suppressing portion
52 suppressing protrusion
53 inclined surface
55 connector-side restricting portion
56 restricting protrusion
57 inclined surface
60, 60A, 60B slide member
61 slide body portion
62 base portion
62A, 62B guide portion (first guide portion)
63 base portion
63A, 63B guide portion (second guide portion)
64 coupling portion
64X through hole
65 groove portion
66 groove portion
67 through portion
68 engaging piece
69 base piece
70 side piece
71 coupling piece
72 slide-side suppressing portion
73 slide-side restricting portion
75 pressed portion
80 tip protecting portion
80X through hole
81 inclined surface (third inclined surface)
82 recess
90 engaged portion
91 engaged piece
92 basis portion
93 flexible piece
94 restricting protrusion
95 inclined surface (first inclined surface)
96 inclined surface (second inclined surface)
97 top surface
100 second connector
101 second terminal
102 connecting portion
110 second connector housing
120 terminal accommodating portion
121 insertion hole
130 pressing portion
140 engaging portion
141 claw
D1 assembly direction
E1 virtual line

What is claimed is:

1. A first connector, comprising:
a first terminal including a tip part extending in a first direction;
a first connector housing for holding the first terminal; and
a slide member to be held in the first connector housing,
the first connector housing including:
a protecting portion for covering a part of the first terminal in directions orthogonal to the first direction except a second direction;
a first opening open in the first direction in the protecting portion; and
a second opening open in the second direction in the protecting portion;
the slide member being slidable between a closing position for closing the second opening and an opening position in a first opposite direction opposite to the first direction; and
the slide member including a slide body portion for closing the second opening at the closing position and a tip protecting portion integrally formed to the slide body portion, the tip protecting portion protecting the tip part of the first terminal at the closing position.

2. The first connector of claim 1, wherein the tip protecting portion is provided on a side further in the first opposite direction than a connected part of a second terminal provided in a second connector to be assembled with the first connector and the first terminal at the opening position.

3. The first connector of claim 1, wherein:
the protecting portion includes a pair of first guide grooves provided in a pair of side walls constituting the second opening,
the slide member includes a pair of first guide portions to be fit into the pair of first guide grooves, and
the slide member is slidable in the first direction and the first opposite direction by the first guide portions being guided by the first guide grooves.

4. The first connector of claim 3, wherein:
the protecting portion includes a pair of second guide grooves provided in the pair of side walls,
the second guide grooves are provided apart from the first guide grooves in the second direction, and
the slide member includes a pair of second guide portions to be fit into the pair of second guide grooves.

5. The first connector of claim 4, wherein:
a planar shape of the slide member when viewed from the first direction is formed point-asymmetrically with respect to a center axis of the slide member extending in parallel to the first direction,
only one of the pair of first guide portions includes a groove portion, and the first guide portion including the groove portion is fittable into one of the pair of first guide grooves, but the first guide portion not including the groove portion is not fittable.

6. The first connector of claim 1 wherein:
the slide member includes a pressed portion to be pressed by a pressing portion provided in a second connector to be assembled with the first connector, and
the slide member slides to the opening position by the pressed portion being pressed by the pressing portion when the second connector is assembled with the first connector.

7. The first connector of claim 6, wherein the pressed portion is brought into surface contact with the pressing portion.

8. The first connector of claim 6, wherein:
the slide member includes an engaged portion to be engaged with an engaging portion provided in the second connector, and
the slide member slides to the closing position by the engaged portion being pulled by the engaging portion when the second connector is detached from the first connector.

9. The first connector of claim 8, wherein:
the slide member includes a flexible piece having a tip part extending in the first direction, the flexible piece being flexible in a direction orthogonal to the first direction,
the engaged portion is provided on a tip part of the flexible piece, and
the engaged portion is provided at a position projecting further in the tip part of the first terminal at the closing position.

10. The first connector of claim 9, wherein:
the tip protecting portion is formed into a ring shape to surround an outer periphery of the first terminal,
a tip part of the tip protecting portion is formed to project further in the first direction than the tip part of the first terminal at the closing position, and
the engaged portion is provided on a part of the tip part of the tip protecting portion.

11. The first connector of claim 10, wherein a surface facing in the first direction in the engaged portion is provided on the same plane as a surface facing in the first direction in the tip protecting portion or provided on a side further in the first opposite direction than the surface facing in the first direction in the tip protecting portion.

12. The first connector of claim 10, wherein:
the first terminal has a connection surface to be connected to a second terminal provided in the second connector,
the slide member includes a recess provided in an inner peripheral surface of the tip protecting portion, and
the recess is facing the connection surface.

13. The first connector of claim 12, wherein:
the first terminal has a non-connection surface provided on a side opposite to the connection surface in a third direction, and
the engaged portion is provided on a side opposite to the recess across the first terminal in the third direction.

14. The first connector of any one of claim 9, wherein:
the slide member has a first inclined surface inclined with respect to a plane orthogonal to an assembly direction of the first connector and the second connector, and
the first inclined surface guides the engaging portion such that the engaging portion and the engaged portion are disengaged with the slide member located at the closing position when the second connector is detached from the first connector.

15. The first connector of claim 9, wherein:
the slide member has a second inclined surface inclined with respect to a plane orthogonal to an assembly direction of the first connector and the second connector, and
the second inclined surface guides the engaging portion such that the engaging portion is engageable with the engaged portion when the second connector is assembled with the first connector.

16. The first connector of claim 9, wherein:
the tip protecting portion has a third inclined surface provided on an outer peripheral surface of a tip part of the tip protecting portion,
the third inclined surface is inclined with respect to a plane orthogonal to an assembly direction of the first connector and the second connector, and
the third inclined surface guides the second connector into the first connector housing when the second connector is assembled with the first connector.

17. The first connector of claim 9, wherein the slide member includes a plurality of the engaged portions.

18. The first connector of claim 9, wherein:
the slide member includes a restricting protrusion provided on the tip part of the flexible piece,
the restricting protrusion projects toward the first terminal in a deflection direction of the flexible piece, and
the engaged portion projects in a direction opposite to a projecting direction of the restricting protrusion.

19. The first connector of claim 18, wherein:
the restricting protrusion has a top surface facing the first terminal, and
a projecting amount of the restricting protrusion is so set that a clearance between the top surface of the restricting protrusion and the first terminal is smaller than an overlap amount of the engaged portion and the engaging portion with the slide member located at the opening position.

20. The first connector of claim 19, wherein:
the top surface of the restricting protrusion is formed on a plane parallel to the first direction, and
the first terminal is formed into a flat plate in a movable range of the restricting protrusion in the first direction and the first opposite direction.

21. A second connector attachable to and detachable from a first connector, the first connector including:
a first terminal including a tip part extending in a first direction;
a first connector housing for holding the first terminal; and
a slide member to be held in the first connector housing, the first connector housing including:
a protecting portion for covering a part of the first terminal in directions orthogonal to the first direction except a second direction;
a first opening open in the first direction in the protecting portion; and
a second opening open in the second direction in the protecting portion;
the slide member being slidable between a closing position for closing the second opening and an opening position in a first opposite direction opposite to the first direction; and
the slide member including a slide body portion for closing the second opening at the closing position and a tip protecting portion integrally formed to the slide body portion, the tip protecting portion protecting the tip part of the first terminal at the closing position, the second connector comprising a pressing portion for sliding the slide member to the opening position by pressing a pressed portion provided in the slide member when the second connector is assembled with the first connector.

22. The second connector of claim 21, comprising an engaging portion for sliding the slide member to the closing position by pulling an engaged portion provided in the slide member when the second connector is detached from the first connector.

23. A connector assembly, comprising:
a first connector; and
a second connector attachable to and detachable from the first connector,
the first connector including:
a first terminal including a tip part extending in a first direction;
a first connector housing for holding the first terminal; and
a slide member to be held in the first connector housing,
the first connector housing including:
   a protecting portion for covering a part of the first terminal in directions orthogonal to the first direction except a second direction;
   a first opening open in the first direction in the protecting portion; and
   a second opening open in the second direction in the protecting portion;
the slide member being slidable between a closing position for closing the second opening and an opening position in a first opposite direction opposite to the first direction; and
the slide member including a slide body portion for closing the second opening at the closing position and a tip protecting portion integrally formed to the slide body portion, the tip protecting portion protecting the tip part of the first terminal at the closing position.

* * * * *